United States Patent
Fu et al.

(10) Patent No.: US 12,389,126 B2
(45) Date of Patent: Aug. 12, 2025

(54) LIGHTING CONTROL FOR MULTI-VIEW IMAGE CAPTURE

(71) Applicants: SONY GROUP CORPORATION, Tokyo (JP); SONY CORPORATION OF AMERICA, New York, NY (US)

(72) Inventors: Chen Fu, San Jose, CA (US); Mohammad Gharavi-Alkhansari, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 339 days.

(21) Appl. No.: 17/986,183

(22) Filed: Nov. 14, 2022

(65) Prior Publication Data
US 2024/0163563 A1 May 16, 2024

(51) Int. Cl.
*H04N 23/72* (2023.01)
*G03B 15/05* (2021.01)
*H04N 13/243* (2018.01)
*H04N 23/56* (2023.01)

(52) U.S. Cl.
CPC .......... *H04N 23/72* (2023.01); *G03B 15/05* (2013.01); *H04N 13/243* (2018.05); *H04N 23/56* (2023.01)

(58) Field of Classification Search
CPC ...... H04N 23/72; H04N 13/243; H04N 23/56; G03B 15/05
See application file for complete search history.

(56) References Cited

U.S. PATENT DOCUMENTS

| 9,123,116 B2 | 9/2015 | Debevec et al. |
| 10,652,436 B2 * | 5/2020 | Iwao ............. H04N 25/60 |
| 2012/0268571 A1 | 10/2012 | Debevec |
| 2016/0261850 A1 | 9/2016 | Debevec |

(Continued)

FOREIGN PATENT DOCUMENTS

| CN | 114299597 A | 4/2022 |
| WO | WO-2019079023 A1 | 4/2019 |

OTHER PUBLICATIONS

Paul Debevec, "The light stages and their applications to photoreal digital actors", SIGGRAPH Asia 2.4, Computer Science, 2012, 4 pages.

(Continued)

*Primary Examiner* — Rowina J Cattungal
(74) *Attorney, Agent, or Firm* — CHIP LAW GROUP

(57) ABSTRACT

An electronic device and method for lighting control for multi-view image capture is provided. The electronic device selects, from a plurality of predefined lighting patterns, a set of lighting patterns to capture a set of images of a subject. The electronic device controls a lighting system to illuminate the subject with a first pulse and a second pulse. An illumination intensity increases from a first intensity to a second intensity, associated with the first pulse and the second pulse respectively. The electronic device controls the lighting system to illuminate the subject with flash pulses corresponding to the selected set of lighting patterns, based on illumination of the subject with the first pulse and the second pulse. The electronic device controls a set of multi-view image capture devices to capture the set of images of the subject, based on illumination of the subject with the selected set of flash pulses.

18 Claims, 6 Drawing Sheets

(56) References Cited

U.S. PATENT DOCUMENTS

2022/0004741 A1     1/2022  Riviere et al.
2022/0107415 A1*    4/2022  Remelius ............. A61B 5/6826
2023/0342909 A1*   10/2023  Hyatt .................... H04N 23/74

OTHER PUBLICATIONS

"State-of-the-Art Lighting System for Photorealistic 3D Face Scanning & Detailed Surface Texture Capture", ESPER LightCage, URL: https://www.esperhq.com/product/lightcage-scanning-rig/, 8 pages.
Wan-Chun Alex Ma: "A Framework for Capture and Synthesis of High Resolution Facial Geometry and Performance", Jun. 19, 2008 (Jun. 19, 2008), XP093116173.
Abhishek Dutta: "Face Shape and Reflectance Acquisition using a Multispectral Light Stage", arxiv.org, Cornell University Library, 201 Olin Library Cornell University Ithaca, NY 14853, May 18, 2011 (May 18, 2011), XP080503255.

* cited by examiner

LIGHTING CONTROL FOR MULTI-VIEW IMAGE CAPTURE

REFERENCE

None.

FIELD

Various embodiments of the disclosure relate to imaging technologies. More specifically, various embodiments of the disclosure relate to an electronic device and a method for control of a lighting system for image capture by use of multi-view image capture devices.

BACKGROUND

Advancements in the field of imaging technologies have led to the development of image capture devices that have the capability to capture high-fidelity images, based on various settings, in different lighting environments. In various scenarios, a lighting system may be used in conjunction with an imaging system to illuminate an object to be captured. The lighting system may be required to be synchronized with the imaging system for capture of the high-fidelity images of the object. The process of synchronization may be a non-trivial task, particularly if high-fidelity images of the object need to be captured, or if high-fidelity scan of the object needs to be obtained, in various lighting conditions. This may be because, the lighting conditions may affect imaging quality (i.e., signal to noise ratio), sensitivity, low-light performance, robustness of the image capture device to motion of the object being captured, and so on. Maintenance of the synchronization between the lighting system and imaging system in different lighting conditions may thus be cumbersome.

Further, images captured using the imaging system may have a shallow depth-of-field. For example, if the object is a person and the head (i.e., the face) of the person needs to be captured, a complete portion of the head may not be in-focus during the capture. The mitigation of the shallow depth-of-field issue may require manual adjustment of focus prior to the capture. However, the manual focusing may affect the quality of captured images or the speed and accuracy of a scan, particularly if the object is in motion during the capture. Furthermore, manually set focus points may be lost in case the imaging system is turned-off or restarted due to the usage of the focus-by-wire technology.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for control of a lighting system for image capture by use of multi-view image capture devices, is provided substantially as shown in and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
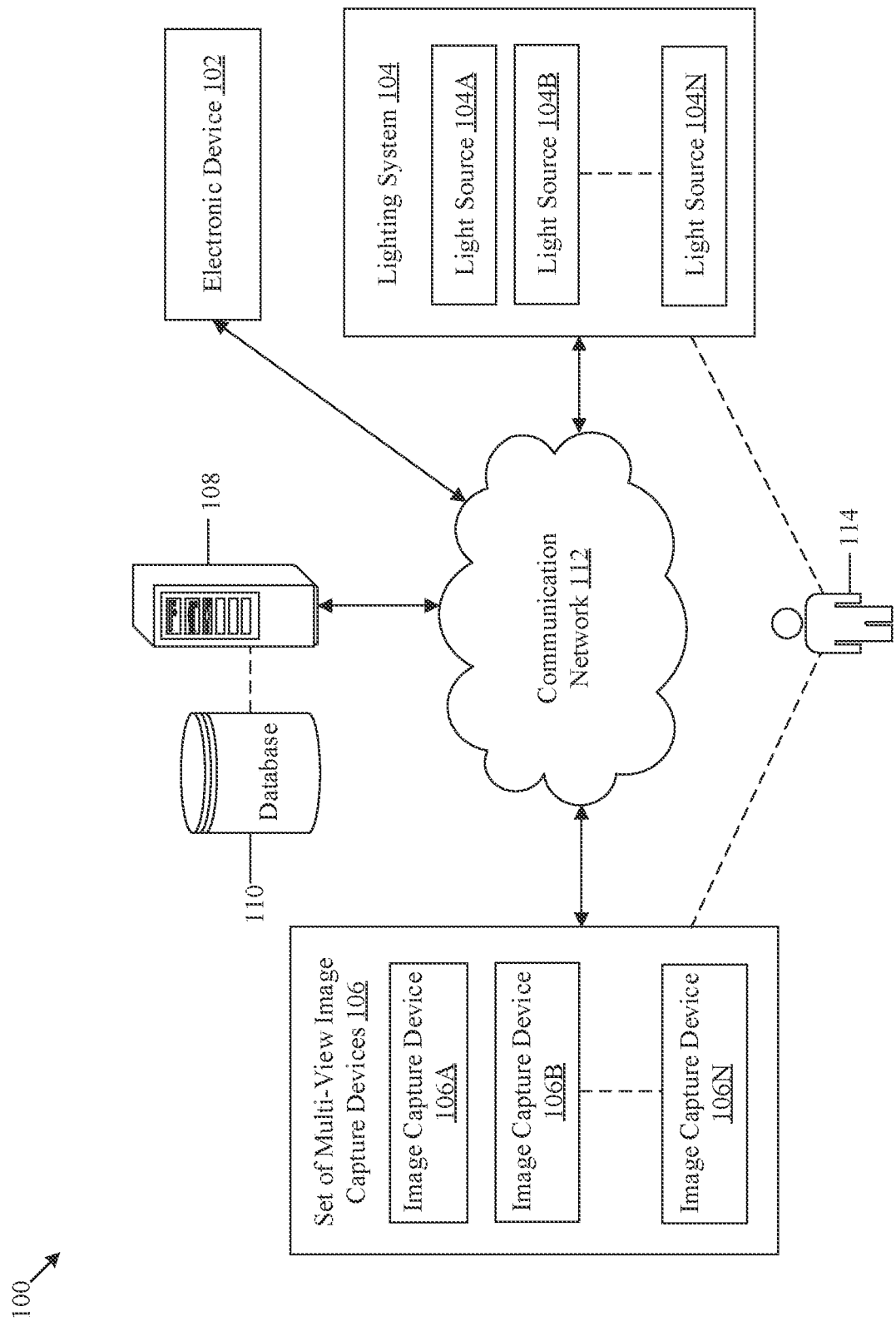
FIG. 1 is a diagram that illustrates an exemplary network environment for control of a lighting system for image capture by use of a set of multi-view image capture devices, in accordance with an embodiment of the disclosure.

The following described implementations may be found in a disclosed electronic device and method for control of a lighting system for image capture by use of multi-view image capture devices. Exemplary aspects of the disclosure provide an electronic device (for example, a computing device, a desktop, a laptop, or a personal computer) that may have capability to control a lighting system to illuminate a subject and control a set of multi-view image capture devices to capture a set of images of the subject. The electronic device may select, from a plurality of predefined lighting patterns (for example, omni-directional lighting patterns or gradient lighting patterns), a set of lighting patterns to capture the set of images of the subject. The electronic device may control the lighting system, associated with the electronic device, to illuminate the subject with a first set of flash pulses including a first pulse and a second pulse. An illumination intensity of the first set of flash pulses may increase from a first intensity, associated with the first pulse, to a second intensity associated with the second pulse. The first intensity, associated with the first pulse, may be lower than the second intensity associated with the second pulse. The electronic device may further control the lighting system to illuminate the subject with a second set of flash pulses, based on the illumination of the subject with the first set of flash pulses. The second set of flash pulses may correspond to the selected set of lighting patterns. The illumination intensity of each of the second set of flash pulses may correspond to the second intensity. The electronic device may further control the set of multi-view image capture devices, associated with the electronic device, to capture each of the set of images of the subject, based on the illumination of the subject with the second set of flash pulses.

An image capture device may be controlled for capture of images of a subject illuminated by a lighting system. If the images need to be captured in a dark environment, the lighting system may trigger flash pulses to illuminate the subject. Typically, the lighting system may flash pulses of intensities that may cause the subject to react momentarily to the abrupt change of the ambient lighting condition (i.e., darkness to light) of the subject. The reaction of the subject may be captured by the image capture device. Thus, user comfort and image quality may be compromised if the subject is not acclimatized to the ambient lighting condition. Further, the flash pulses triggered by the lighting system may correspond to typical lighting patterns. However, a careful and heuristic-based selection of lighting patterns may be necessary to obtain a high-fidelity 3-Dimensional (3D) facial geometry and material scan. The existing image capture systems may not control the lighting system to trigger flash pulses that correspond to appropriate lighting patterns based on such requirements.

Typically, the lighting system may not trigger flash pulses in synchronization with respect the opening and closing of a shutter of the image capture device. For example, the speed of the shutter may not be adjusted or controlled with respect to the triggering of a flash pulse by the lighting system. A lack of coordination between the triggering of the flash pulse and the shutter speed may lead to missing frames (due to low shutter speed), missing flash pulses (due to high shutter speed), and so on. For example, the flash pulse may be missed if a duration of the flash pulse is such that the flash pulse remains turned ON while the shutter is closing.

Typically, characteristics of one or more sensors of the image capture device may affect the depth-of-field. For example, for an 85 mm lens in F9 aperture for a 35 mm sensor, if images of the subject are captured to obtain a 3D head-model, half of the head may be in-focus. The one or more lenses of the image capture device may employ focus-by-wire techniques to capture the images of the subject. Thus, a user (for example, a photographer) may need to manually set or adjust the focus prior to the capture of the images. The necessity of manual focusing increases sensitivity of the imaging system to the slightest motion of the subject during the image capture. For example, a head motion of the subject during the image capture may lead to various types of degradations, such as, a blurriness, a degradation in the captured image quality, inaccuracies in estimation of a 3D model of the subject, an underestimation of reflectance components, and so on. Further, the one or more lenses of the image capture device may require to be refocused each time the image capture device is turned-off or restarted.

In order to address such issues, the disclosed electronic device may control a lighting system or a set of multi-view image capture devices to select a set of lighting patterns. The electronic device may control an intensity and polarization of light emitted by one or more light sources of the lighting system for generation of the selected set of lighting patterns. The multi-view image capture devices may be controlled to capture images of a subject illuminated with the selected set of lighting patterns. The images of the subject, captured based on illumination of the subject with the selected set of lighting patterns, may be used for high-fidelity 3-Dimensional (3D) facial scan and precise estimation of 3D geometry (for example, facial geometry). The captured images may be further used for high-quality reconstruction of facial shape and texture, accurate performance of material scan (for example, scan of facial material) of the subject (illuminated with the selected set of lighting patterns), or the like. The material scan may be used for estimation of material properties of the skin and generation of a photo-realistic 3D representation of the head (or face) of the subject. The electronic device may further control the lighting system to trigger flash pulses of various intensities, where a triggering of a flash pulse of a higher intensity may succeed a triggering of a flash pulse of lower intensity. Such sequence of flash pulse triggering may prevent the subject from exposure to abrupt or steep changes in intensities of the flash pulses, which may be uncomfortable for the subject's eye and in some cases damage the subject's vision.

The disclosed electronic device may further control an auto-focus setting of image capture devices of the set of multi-view image capture devices prior to the capture of the images of the subject. The auto-focus setting may also be controlled prior to the capture of the images of the subject if there is a change in detected expression or emotion manifested by the subject or a change in the lighting pattern used to illuminate the subject. The control of the auto-focus may ensure that a movement of the subject during the capture of the images does not have an impact on the accuracy of the 3D facial scan or the material scan. The electronic device may further set the shutter speed of each of the image capture devices of the set of multi-view image capture devices to optimum values for the capture of images in both single-shot and burst modes. The electronic device may perform 3D facial scan and determine 3D color texture in the single-shot mode. The electronic device may additionally determine multiple textures (including the color structure) in the burst mode.

FIG. 1 is a diagram that illustrates an exemplary network environment for control of a lighting system for image capture by use of a set of multi-view image capture devices, in accordance with an embodiment of the disclosure. With reference to FIG. 1, there is shown a network environment 100. The network environment 100 includes an electronic device 102, a lighting system 104, a set of multi-view image capture devices 106, and a server 108. In at least one embodiment, the lighting system 104 may include a light source 104A, a light source 104B, . . . , and a light source 104N. In at least one embodiment, the set of multi-view image capture devices 106 may include an image capture device 106A, an image capture device 106B, . . . , and an image capture device 106N. In at least one embodiment, the server 108 may include a database 110. The electronic device 102 may communicate with the lighting system 104, the set of multi-view image capture devices 106, and/or the server 108, through one or more networks (such as, a communication network 112). There is further shown a subject 114 associated with the lighting system 104 and the set of multi-view image capture devices 106. The electronic device 102 may control the lighting system 104 to illuminate the subject 114 with flash pulses. The electronic device 102 may control the set of multi-view image capture devices 106 to capture images of the subject 114.

The N number of light sources and the N number of image capture devices shown in FIG. 1 are presented merely as an example. The lighting system 104 and the set of multi-view image capture devices 106 may include only one or more than N light sources and image capture devices, respectively, without deviation from the scope of the disclosure. For the sake of brevity, only N light sources (in the lighting system 104) and N image capture devices (in the set of multi-view image capture devices 106) have been shown in FIG. 1.

The electronic device 102 may include suitable logic, circuitry, interfaces, and/or code that may be configured to control the lighting system 104 to trigger flash pulses that correspond to omni-directional lighting patterns and spherical gradient lighting patterns. The electronic device 102 may select a set of lighting patterns that include cross-polarized or parallel-polarized omni-directional lighting patterns and cross-polarized or parallel-polarized spherical gradient lighting patterns. The electronic device 102 may control the lighting system 104 to illuminate the subject 114 with flash pulses. The electronic device 102 may control the set of multi-view image capture devices 106 to capture images of the subject 114 based on the illumination of the subject 114 with flash pulses that correspond to the omni-directional or the spherical gradient lighting patterns. Examples of the electronic device 102 may include, but may not be limited to, a desktop, a tablet, a laptop, a computing device, a smartphone, a cellular phone, a mobile phone, a control device associated with image sensors and a lighting system, or a consumer electronic (CE) device having a display.

The lighting system 104 may include suitable logic, circuitry, interfaces, and/or code that may be configured to illuminate the subject 114 with flash pulses. The lighting system 104 may include a plurality of light sources (for example, the light source 104A, the light source 104B, . . . , and the light source 104N). In at least one embodiment, each light source of the plurality of light sources may correspond to an electronically controlled lighting fixture. The plurality of light sources may be spatially arranged in an environment to illuminate the subject 114 with the flash pulses from a left-hand side of the subject 114, a right-hand side of the subject 114, a top of the subject 114, a bottom of the subject 114, a front of the subject 114, or a back of the subject 114. Each light source of the plurality of light sources may include one or more polarizers (i.e., polarizing filters). The one or more polarizers may linearly (for example, horizontally or vertically) polarize light emitted by the light source. In at least one embodiment, each light source of the plurality of light sources may include circular polarizers that may transform linearly polarized light into cross-polarized or parallel-polarized lighting patterns. Examples of each light source of the plurality of light sources may include, but are not limited to, an incandescent lamp, a halogen lamp, a Light Emitting Diode (LED) lamp, a metal halide lamp, a low-pressure sodium lamp, a fluorescent lamp/tube, a high intensity discharge lamp, or a neon lamp. In an embodiment, the lighting system 104 may correspond to a light cage arrangement (e.g., a light stage) that may be positioned around the subject 114 to illuminate the subject 114 from various angles/directions based on trigger pulses.

The set of multi-view image capture devices 106 may include suitable logic, circuitry, interfaces, and/or code that may be configured to capture the set of images of the subject 114 based on the illumination of the subject 114 by the lighting system 104. The set of multi-view image capture devices 106 may include a plurality of image capture devices (for example, the image capture device 106A, the image capture device 106B, . . . , and the image capture device 106N). In an embodiment, the set of multi-view image capture devices 106 may capture a 360-degree view of the subject 114. Each image capture device of the set of multi-view image capture devices 106 may be configured to capture a portion of the 360-degree view of the subject 114.

In an embodiment, the 360-degree view of the subject 114 may be used to generate a 3-dimensional (3D) scan of the subject 114. A lens of each image capture device may be coupled to a circular polarizing filter. The circular polarizing filter may receive horizontal or vertical polarized light and generate cross-polarized or parallel polarized (omni-directional or spherical gradient) lighting patterns. In at least one embodiment, each image capture device of the set of multi-view image capture devices 106 may be a high-resolution still camera with a burst capability. The image capture devices of the set of multi-view image capture devices 106 may capture fine skin details and generate high resolution mesh & textures. Further, the image capture devices may have a large bit-depth (for example, the image capture devices may generate a 14-bit RAW file for high dynamic range (HDR) textures). The image capture devices may provide optimum low light performance and have low sensor noise. Examples of each image capture device may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices.

The server 108 may include suitable logic, circuitry, interfaces, and/or code that may be configured to receive the set of captured images of the subject 114 from the electronic device 102. In at least one embodiment, the server 108 may determine a 3D facial geometry associated with the subject 114, based on the captured images of the subject 114, to construct a photo-realistic relightable model of the head of the subject 114. The 3D geometry may be determined based on information extracted from the captured images of the subject 114. The server 108 may be configured to perform (facial) shape reconstruction or separation between diffuse reflection components and specular reflection components, based on an illumination of the subject 114 with a selected set of lighting patterns (for example, the cross-polarized or the parallel polarized omni-directional lighting patterns). The diffuse reflection and specular reflection components may correspond to light reflected from facial surface associated with the subject 114 and captured by the set of multi-view image capture devices 106. The server 108 may be further configured to generate a normal map and a height map based on the illumination of the subject 114 with a selected set of lighting patterns (for example, a cross-polarized or parallel polarized spherical gradient lighting patterns). The server 108 may execute operations through web applications, cloud applications, HTTP requests, repository operations, file transfer, and the like. Example implementations of the server 108 may include, but are not limited to, a database server, a file server, a web server, an application server, a mainframe server, a cloud computing server, or a combination thereof.

In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the electronic device 102 as two separate entities. In certain embodiments, the functionalities of the server 108 can be incorporated in its entirety or at least partially in the electronic device 102, without a departure from the scope of the disclosure.

The database 110 may include suitable logic, interfaces, and/or code that may be configured to store the set of images of the subject 114 captured by the set of multi-view image capture devices 106. The database 110 may be derived from data off a relational or non-relational database or a set of comma-separated values (csv) files in conventional or big-data storage. The database 110 may be stored or cached on a device, such as, the electronic device 102 or the server 108. In some embodiments, the database 110 may be hosted on a plurality of servers or devices at same or different locations. The operations of the database 110 may be executed using hardware including a processor, a microprocessor (e.g., to perform or control performance of one or more operations), a field-programmable gate array (FPGA), or an application-specific integrated circuit (ASIC). In some other instances, the database 110 may be implemented using software.

The communication network 112 may include a communication medium through which the electronic device 102, the lighting system 104, the set of multi-view image capture devices 106, and the server 108, may communicate with each other. The communication network 112 may be a wired or wireless communication network. Examples of the communication network 112 may include, but are not limited to, the Internet, a cloud network, Cellular or Wireless Mobile Network (such as Long-Term Evolution and 5th Generation (5G) New Radio (NR)), a satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may be configured to select, from a plurality of predefined lighting patterns, a set of lighting patterns to capture images of the subject 114. In accordance with an embodiment, the electronic device 102 may receive a user input indicative of the selection of the set of lighting patterns from amongst the plurality of predefined lighting patterns. The subject 114 may be illuminated with the selected set of lighting patterns via flash pulses. In accordance with an embodiment, the plurality of predefined lighting patterns may include an omni-directional lighting pattern, a directional lighting pattern, a cross-polarized lighting pattern, and a parallel-polarized lighting pattern. The set of lighting patterns, selected from amongst the plurality of predefined lighting patterns, may be categorized as a first set of lighting patterns and a second set of lighting patterns. The first set of lighting patterns may include a cross-polarized omni-directional lighting pattern and a parallel-polarized omni-directional lighting pattern. The second set of lighting patterns may include cross-polarized spherical gradient lighting patterns and parallel-polarized spherical gradient lighting patterns.

In accordance with an embodiment, the categorization may be based on information that may be extracted based on illumination of the subject 114 with flash pulses corresponding to the selected set of lighting patterns. The extracted information may include details associated with facial skin, high-resolution 3D facial mesh (i.e., 3D facial geometry), high-resolution facial texture map, material properties associated with facial skin, facial diffuse reflectance components, specular reflectance components, normal and height maps, or the like. The details of selection of the set of lighting patterns, from the plurality of predefined lighting patterns, are further described, for example, in FIGS. 3 and 4 (at 402).

The electronic device 102 may be further configured to control the lighting system 104, associated with the electronic device 102, to illuminate the subject 114 with a first set of flash pulses including a first pulse and a second pulse. An illumination intensity of the first set of flash pulses may increase from a first intensity to a second intensity. The first intensity may be associated with the first pulse and the second intensity may be associated with the second pulse. The first intensity may be lower than the second intensity. In accordance with an embodiment, the first pulse may correspond to a modeling light and the first intensity may correspond to a predefined intensity. In accordance with an embodiment, the electronic device 102 may control the lighting system 104 to illuminate the subject 114 with the first pulse of a lower intensity. Thereafter, the lighting system 104 may illuminate the subject 114 with the second pulse of a higher intensity. A gradual increase in illumination intensity, from the first intensity (i.e., the lower intensity) associated with the first pulse, to the second intensity associated with the second pulse (i.e., the higher intensity), may allow the subject 114 to get acclimatized to the second intensity (i.e., the higher intensity).

The acclimatization may be necessary since the subject 114 may be illuminated with flash pulses corresponding to the second intensity to capture the images of the subject 114. The acclimatization may prevent the subject 114 from being exposed to an abrupt change in light intensity, which may be uncomfortable for the subject 114. For example, if the subject 114 is not acclimatized to the second intensity, a sudden triggering of the second pulse of the second intensity may cause the subject 114 to voluntarily or involuntarily close eyes. The illumination of the subject 114 with the first pulse of the first intensity, prior to the illumination of the subject 114 with the second pulse of the second intensity, may ensure eye comfort for the subject 114. The details of control of the lighting system 104 for illumination of the subject 114 with the first set of flash pulses, are further described, for example, in FIGS. 3 and 4 (at 404).

The electronic device 102 may be further configured to control the lighting system 104 to illuminate the subject 114 with a second set of flash pulses, based on the illumination of the subject 114 with the first set of flash pulses. In accordance with an embodiment, the second set of flash pulses may correspond to the selected set of lighting patterns. The selected set of lighting patterns may correspond to at least one of, but not limited to, the first set of lighting patterns or the second set of lighting patterns. The second set of flash pulses, that correspond to the first set of lighting patterns (i.e., the cross-polarized or parallel-polarized omni-directional lighting patterns) of the selected set of lighting patterns, may be used for shape (for example, facial shape or geometry) reconstruction or separation of diffuse and specular reflectance components. The illumination intensity of each flash pulse of the second set of flash pulses that correspond to the first set of lighting patterns may be equal to the second intensity.

In accordance with an embodiment, the electronic device 102 may control the lighting system 104 to illuminate the subject 114 with the second set of flash pulses that correspond to the second set of lighting patterns (i.e., the cross-polarized or parallel-polarized spherical gradient lighting patterns). The electronic device 102 may control illumination intensities associated with the second set of flash pulses based on positions of the light sources of the lighting system 104 that trigger the second set of flash pulses and a particular spherical gradient lighting pattern of the second set of lighting patterns used to illuminate the subject 114. The second set of flash pulses, that correspond to the second set of lighting patterns (i.e., the cross-polarized or parallel-polarized spherical gradient lighting patterns) of the selected set of lighting patterns, may be used for normal map generation and height map generation.

In some embodiments, the electronic device 102 may control the lighting system 104 to illuminate the subject 114 with the second set of flash pulses that correspond to vertically polarized or horizontally polarized lighting. The second set of flash pulses that correspond to the vertically polarized lighting may be transformed to a cross-polarized omni-directional lighting pattern or a cross-polarized spherical gradient lighting pattern. Similarly, the second set of flash pulses that correspond to the horizontally polarized lighting may be transformed to a parallel-polarized omni-directional lighting pattern or a parallel-polarized spherical gradient lighting pattern. The details of control of the lighting system 104 for illumination of the subject 114 with the second set of flash pulses, are further described, for example, in FIGS. 3 and 4 (at 406).

The electronic device 102 may be further configured to control the set of multi-view image capture devices 106 associated with the electronic device 102 to capture images of the subject 114, based on the illumination of the subject 114 with the second set of flash pulses. For example, the selected set of lighting patterns may include '11' lighting patterns. For each lighting pattern (i.e., the subject 114 illuminated with the lighting pattern), the electronic device 102 may capture a set of images. The images in each set of images may be captured concurrently by all the image capture devices (for example, image capture device 106A) of the set of multi-view image capture devices 106. The number of images in each set of images may be based on number of image capture devices in the set of multi-view image capture devices 106. For example, the set of images captured for each lighting pattern may include '6' images (captured concurrently) if the set of multi-view image capture devices 106 includes '6' image capture devices. Thus, in such case, for each lighting pattern, the electronic device 102 may capture '6' images. Therefore, the second set of flash pulses may include '66' (i.e., 6*11=66) flash pulses, since the electronic device 102 may capture '6' images for each of the '11' selected lighting patterns (i.e., '6' images for each lighting pattern).

In accordance with an embodiment, the set of multi-view image capture devices 106 may capture each of the set of images based on a reception of the second set of flash pulses, that correspond to the selected set of lighting patterns, reflected from a surface (for example, skin) of the subject 114. In accordance with another embodiment, the set of multi-view image capture devices 106 may capture each of the set of images based on a reception of reflected light that correspond to the vertically or horizontally polarized lighting. The set of multi-view image capture devices 106 may transform the vertically or horizontally polarized lighting patterns to cross-polarized or parallel polarized (omni-directional or spherical gradient) lighting patterns based on the capture of each of the set of images.

The electronic device 102 may be further configured to generate a photo-realistic relightable head model associated with the subject 114 based on the captured sets of images of the subject 114. The electronic device 102 (by use of each of the captured set of images) may determine details associated with facial skin, extract high-resolution 3D facial mesh (3D facial geometry), generate high-resolution facial texture map, facial shape reconstruction, estimate material properties associated with facial skin, separate facial diffuse reflectance components and specular reflectance components, generate normal and height maps, or the like. The photo-realistic relightable head model may be generated based on one or more of the facial skin details, 3D facial mesh, facial texture map, material properties associated with facial skin, diffuse and specular reflectance separation, or normal and height maps. The details of control of the set of multi-view image capture devices 106 for capture of images of the subject 114, are further described, for example, in FIGS. 3 and 4 (at 408).

Figure 2:
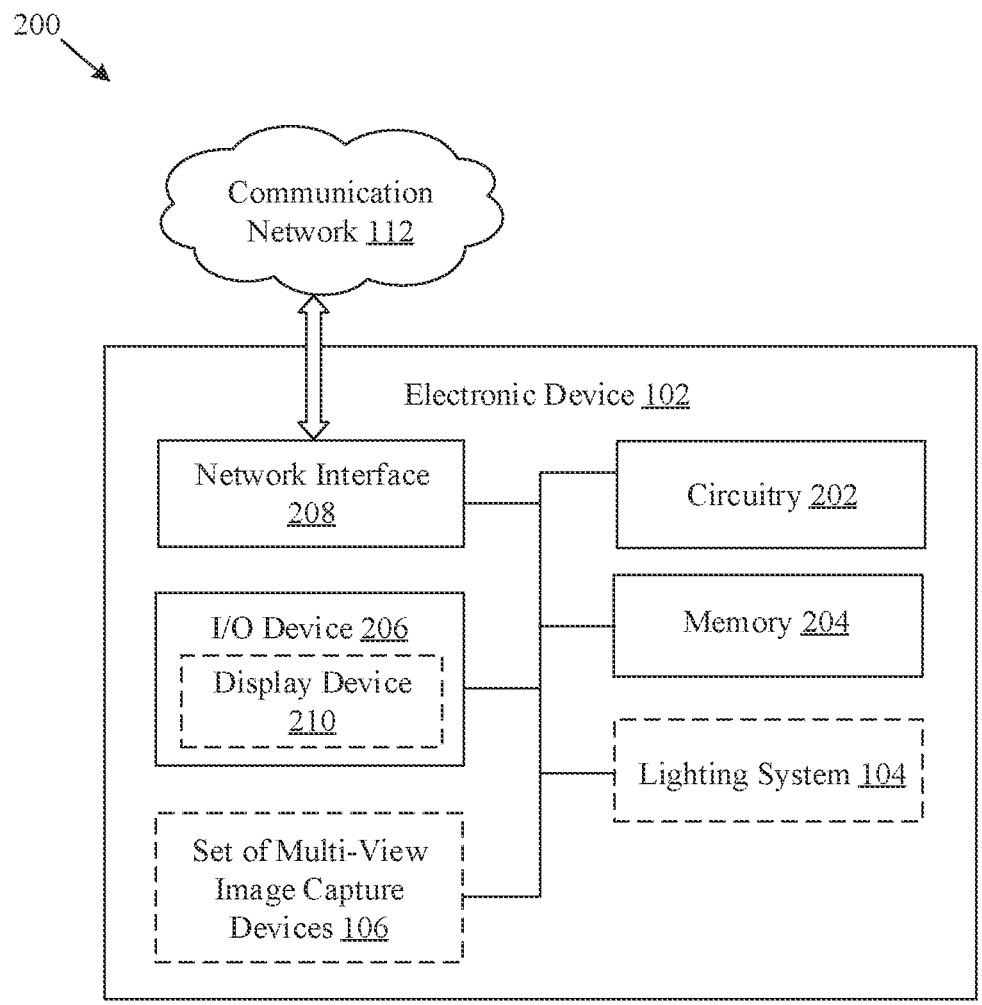
FIG. 2 is a block diagram that illustrates an exemplary electronic device of FIG. 1, for control of a lighting system and a set of multi-view image capture devices for capture of a set of images of a subject, in accordance with an embodiment of the disclosure.

FIG. 2 is a block diagram that illustrates an exemplary electronic device of FIG. 1, for control of a lighting system and a set of multi-view image capture devices for capture of a set of images of a subject, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, a network interface 208, the lighting system 104, and the set of multi-view image capture devices 106. In at least one embodiment, the I/O device 206 may also include a display device 210. The circuitry 202 may be communicatively coupled to the memory 204, the I/O device 206, the network interface 208, the lighting system 104, and the set of multi-view image capture devices 106, through wired or wireless communication of the electronic device 102.

The circuitry 202 may include suitable logic, circuitry, and interfaces that may be configured to execute program instructions associated with different operations to be executed by the electronic device 102. The operations may include selection, from a plurality of predefined lighting patterns, a set of lighting patterns to capture a set of images of the subject 114. The operations may further include control of the lighting system 104, associated with the electronic device 102, to illuminate the subject 114 with a first set of flash pulses including a first pulse and a second pulse. The operations may further include control of the lighting system 104 to illuminate the subject 114 with a second set of flash pulses, that correspond to the selected set of lighting patterns, based on the illumination of the subject 114 with the first set of flash pulses. The operations may further include control of the set of multi-view image capture devices 106, associated with the electronic device 102, to capture each of the set of images of the subject 114, based on the illumination of the subject 114 with the second set of flash pulses. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. The program instructions stored on the memory 204 may enable the circuitry 202 to execute operations of the circuitry 202 (and/or the electronic device 102). In at least one embodiment, the memory 204 may store the images of the subject 114 that have been captured by the set of multi-view image capture devices 106. The memory 204 may also store information associated with the selected lighting patterns (such as the omni-directional or spherical gradient lighting patterns, which may be cross polarized or parallel polarized) for capture of the sets of images. The memory 204 may further store a determined 3D geometry of the head (face) of the subject 114, a material scan (i.e., scan of facial skin material), or properties (such as reflectance or scattering) associated with the facial skin. The memory 204 may store a photo-realistic relightable model of (the head) of the subject 114, derived based on the 3D geometry and the material scan. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a user input associated with selection of the set of lighting patterns from the plurality of predefined lighting patterns. The I/O device 206 may further receive a user input indicative of an instruction (to the lighting system 104) to trigger the first set of flash pulses and the second set of flash pulses (to illuminate the subject 114). The I/O device 206 may further receive a user input indicative of an instruction (to the set of multi-view image capture devices 106) to capture images of the subject 114 based on the illumination of the subject 114 with the second set of flash pulses. The I/O device 206 may further receive a user input that indicates that a first set of images have been captured based on illumination of the subject 114 with a lighting pattern of the set of lighting patterns. In some embodiments, the I/O device 206 may receive a user input indicative of an instruction to generate a photo-realistic relightable model of the face (head) of the subject 114. Examples of the I/O device 206 may include, but are not limited to, a touch screen, a keyboard, a mouse, a joystick, a microphone, the display device 210, and a speaker. Examples of the I/O device 206 may further include braille I/O devices, such as, braille keyboards and braille readers.

The I/O device 206 may include the display device 210. The display device 210 may include suitable logic, circuitry, and interfaces that may be configured to receive inputs from the circuitry 202 to render, on a display screen, the captured images of the subject 114. The display device 210 may be further configured to render parameters determined based the captured images of the subject 114. In accordance with an embodiment, the display device 210 may be configured to render the photo-realistic relightable model of the head of the subject 114. In at least one embodiment, the display screen may be at least one of a resistive touch screen, a capacitive touch screen, or a thermal touch screen. The display device 210 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 208 may include suitable logic, circuitry, and interfaces that may be configured to facilitate a communication between the circuitry 202, the lighting system 104, the set of multi-view image capture devices 106, and the server 108, via the communication network 112. The network interface 208 may be implemented by use of various known technologies to support wired or wireless communication of the electronic device 102 with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, and a wireless pear-to-pear protocol.

The functions or operations executed by the electronic device 102, as described in FIG. 1, may be performed by the circuitry 202. Operations executed by the circuitry 202 are described in detail, for example, in FIGS. 3, 4, 5A, and 5B.

Figure 3:
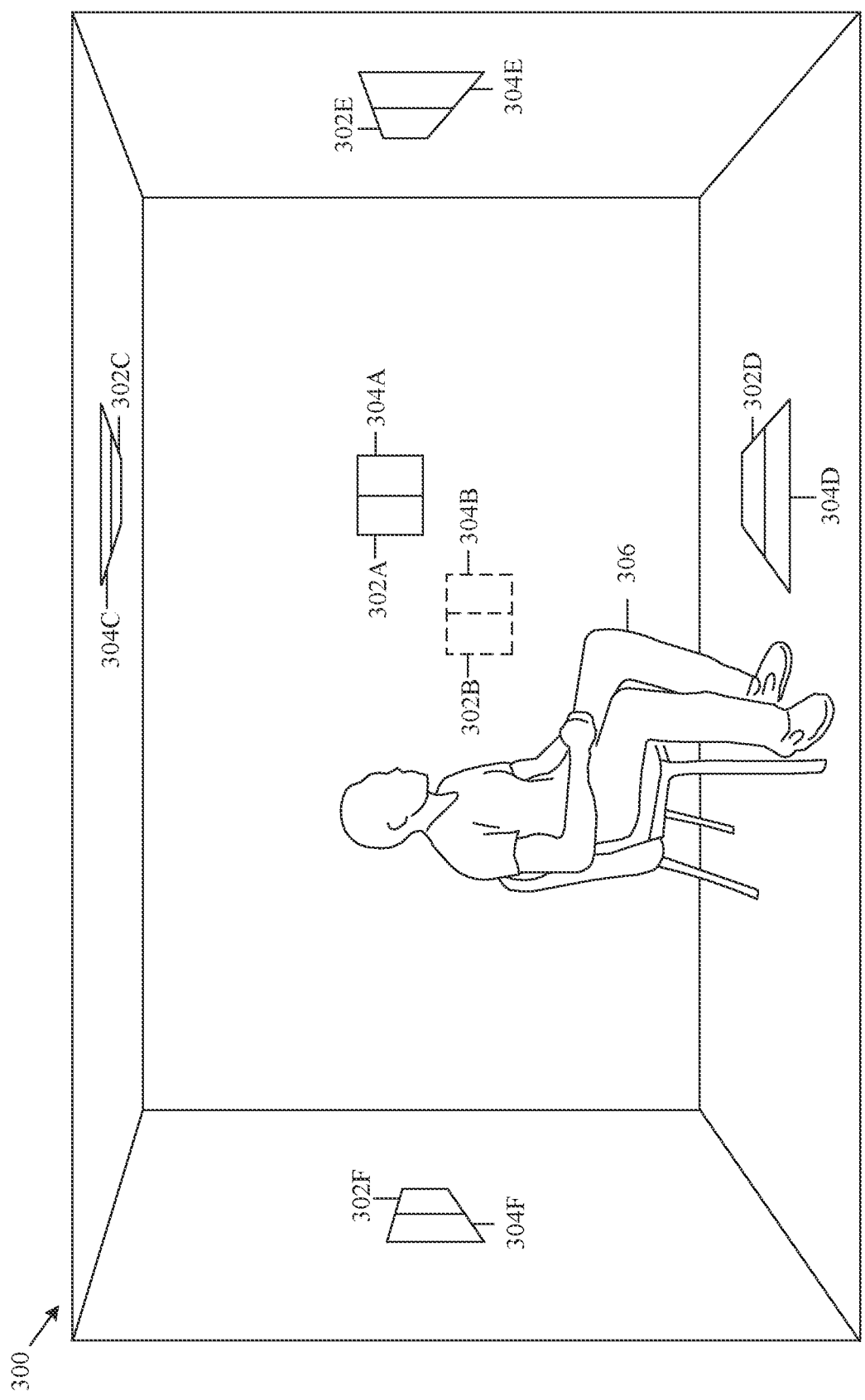
FIG. 3 is a diagram that illustrates an exemplary environment for capture of images of a subject, illuminated by a set of lighting patterns, by use of a set of multi-view image capture devices, in accordance with an embodiment of the disclosure.

FIG. 3 is a diagram that illustrates an exemplary environment for capture of images of a subject, illuminated by a set of lighting patterns, by use of a set of multi-view image capture devices, in accordance with an embodiment of the disclosure. FIG. 3 is explained in conjunction with elements from FIG. 1 and FIG. 2. With reference to FIG. 3, there is shown an exemplary environment 300. The exemplary environment 300 may be an indoor or an outdoor environment, which may be used by photographers or professionals associated with creative industries (such as a game industry or a movie industry) for capture images of subjects seated on a platform (for example, a chair) in the exemplary environment 300. In an embodiment, the captured images may be used to generate photo-realistic relightable models of the head of the subjects seated on the platform. In FIG. 3, there is shown a subject 306 in the environment 300. The subject 306 may be illuminated with a set of light sources (denoted, for example, by light sources 302A . . . 302F) to capture images by use of a set of image capture devices (denoted, for example, by image capture devices 304A . . . 304F).

For example, in the environment 300, there is shown a lighting system that comprises the set of light sources, viz., 302A, 302B, 302C, 302D, 302E, and 302F (hereinafter, 302A . . . 302F). The set of light sources 302A . . . 302F may be an exemplary implementation of the light sources 104A . . . 104N. The functionalities of the set of light sources 302A . . . 302F may be identical to that of the light sources 104A . . . 104N. In an example, the light source 302A may trigger flash pulses to illuminate the subject 306 from a left-hand side of the subject 306. The light source 302B may trigger flash pulses to illuminate the subject 306 from a right-hand side of the subject 306. Further, the light source 302C may trigger flash pulses to illuminate the subject 306 from a top of the subject 306, while the light source 302D may trigger flash pulses to illuminate the subject 306 from a bottom of the subject 306. Similarly, the light source 302E may trigger flash pulses to illuminate the subject 306 from a front-side of the subject 306, and the light source 302F may trigger flash pulses to illuminate the subject 306 from a back-side of the subject 306.

There is further shown the set of image capture devices, viz., 304A, 304B, 304C, 304D, 304E, and 304F (hereinafter, 304A . . . 304F). The set of image capture devices 304A . . . 304F may be an exemplary implementation of the image capture devices 106A . . . 106N. The functionalities of the set of image capture devices 304A . . . 304F may be identical to that of the image capture devices 106A . . . 106N. The image capture device 304A may capture a left-hand side view of the subject 306. The image capture device 304B may capture a right-hand side view of the subject 306. Further, the image capture device 304C may capture a top view of the subject 306, while the image capture device 304D may capture a bottom view of the subject 306. Similarly, the image capture device 304E may capture a front-side view of the subject 306, while the image capture device 304F may capture a back-side view of the subject 306.

The six light sources (i.e., the light sources 302A, 302B, 302C, 302D, 302E, and 302F), and the six image capture devices, (i.e., the image capture devices 304A, 304B, 304C, 304D, 304E, and 304F) shown in FIG. 3 are presented merely as an example. The environment 300 may include only one or more than six light sources and only one or more than six image capture devices, without deviation from the scope of the disclosure. For the sake of brevity, only 6 light sources and 6 image capture devices have been shown in FIG. 3.

In accordance with an embodiment, the circuitry 202 of the electronic device 102 may control each of the set of light sources 302A . . . 302F to trigger a first set of flash pulses. The first set of flash pulses may include a first pulse and a second pulse. The subject 306 may initially be illuminated with the first pulse followed by the second pulse. The illumination intensity of the first set of flash pulses may increase from a first intensity associated with the first pulse to a second intensity associated with the second pulse. The second intensity may be greater than the first intensity. The illumination of the subject 306 with the first pulse (of a lower intensity) may facilitate the subject 306 to get acclimatized to the second pulse associated with the second intensity (of a higher intensity).

In accordance with an embodiment, each of the set of light sources 302A . . . 302F may include a linear polarizer. The linear polarizers may transform unpolarized light, emitted by each of the set of light sources 302A . . . 302F, to horizontally polarized light or vertically polarized light. The set of light sources 302A . . . 302F may further include a circular polarizer (that may include a linear polarizer and a quarter-wave plate). The circular polarizer may transform the horizontally polarized light into parallel polarized lighting patterns. Similarly, the circular polarizer may transform the vertically polarized light into cross polarized lighting patterns.

In some embodiments, the circuitry 202 may be configured to control the set of image capture devices 304A . . . 304F to capture images of the subject 306 based on illumination of the subject 306 with a horizontally polarized light or a vertically polarized light. Each image capture device of the set of image capture devices 304A . . . 304F may include a circular polarizer. The circular polarizer may be coupled to a lens of an image capture device (for example, the image capture device 304A). The circular polarizer may transform the horizontally polarized reflected light or the vertically polarized reflected light to a parallel polarized lighting patterns or a cross polarized lighting patterns, respectively. The transformation may be based on the capture of the images of the subject 306.

The circuitry 202 of the electronic device 102 may be further configured to select a set of lighting patterns to capture images of the subject 306. The set of lighting patterns may be selected from a first set of lighting patterns and a second set of lighting patterns. In accordance with an embodiment, the first set of lighting patterns may include at least one of a cross-polarized omni-directional lighting pattern or a parallel-polarized omni-directional lighting pattern. In accordance with an embodiment, the second set of lighting patterns may include a first subset of cross-polarized spherical gradient lighting patterns and a second subset of parallel-polarized spherical gradient lighting patterns. The first subset of cross-polarized spherical gradient lighting patterns includes cross-polarized spherical gradient lighting patterns that may illuminate the subject 306 from at least one of a left-hand side of the subject 306, a right-hand side of the subject 306, a top of the subject 306, a bottom of the subject, a front-side of the subject 306, and a back-side of the subject 306. Similarly, the second subset of parallel-polarized spherical gradient lighting patterns includes parallel-polarized spherical gradient lighting patterns that may illuminate the subject 306 from at least one of the left-hand side of the subject 306, the right-hand side of the subject 306, the top of the subject 306, the bottom of the subject, the front-side of the subject 306, and the back-side of the subject 306.

In accordance with an embodiment, the selection of the set of lighting patterns may be based on control of the circular polarizer included in each of the set of light sources 302A . . . 302F. The circuitry 202 may control the circular polarizer to enable the set of light sources 302A . . . 302F to illuminate the subject 306 with a certain lighting pattern of the first set of lighting patterns and the second set of lighting patterns.

In some embodiments, the selection of the set of lighting patterns may be based on control of the circular polarizer coupled to the lens of each image capture device of the set of image capture devices 304A . . . 304F. The circular polarizer may enable selection of a certain lighting pattern of the first set of lighting patterns and the second set of lighting patterns, based on the capture of images of the subject 306.

The circuitry 202 may be further configured to control each of the set of light sources 302A . . . 302F to trigger a second set of flash pulses based on the illumination of the subject 306 with the first set of flash pulses. In at least one embodiment, the second set of flash pulses may be triggered after the illumination of the subject 114 with the first set of flash pulses. The second set of flash pulses may correspond to the selected set of lighting patterns. For example, at a first time-instant, each light source of the set of light sources 302A . . . 302F may trigger a first flash pulse of the second set of flash pulses. The illumination intensity of the first flash pulse, triggered by each light source of the set of light sources 302A . . . 302F, may correspond to the second intensity. Thus, six first flash pulses (triggered by the light sources 302A, 302B, 302C, 302D, 302E, and 302F) may be triggered concurrently, at the first time-instant. The six first flash pulses may correspond to the cross-polarized omni-directional lighting pattern. The circuitry 202 may be further configured to control each image capture device of the set of image capture devices 304A ... 304F to capture an image of the subject 306. Thus, six images may be captured at the first time-instant based on illumination of the subject 306 with the cross-polarized omni-directional lighting pattern (via the six first flash pulses).

Similarly, at a second time-instant, the set of light sources 302A ... 302F may trigger six second flash pulses with an illumination intensity that corresponds to the second intensity. The six second flash pulses may correspond to the parallel-polarized omni-directional lighting pattern. The set of image capture devices 304A ... 304F may capture six images concurrently, at the second time-instant, based on illumination of the subject 306 with the parallel-polarized omni-directional lighting pattern (via six second flash pulses).

In accordance with an embodiment, the circuitry 202 may be configured to select all lighting patterns from the first subset of cross-polarized spherical gradient lighting patterns and three lighting patterns of the second subset of parallel-polarized spherical gradient lighting patterns. The selected lighting patterns may include the cross-polarized spherical gradient lighting patterns that may illuminate the subject 306 from the left-hand side, the right-hand side, the top, the bottom, the front-side, and the back-side. The selected lighting patterns may further include the parallel-polarized spherical gradient lighting patterns that may illuminate the subject 306 from the left-hand side, the top, and the front-side.

Based on the selection of the lighting patterns from the first subset of cross-polarized spherical gradient lighting patterns, the set of light sources 302A ... 302F may trigger six third flash pulses concurrently, at the third time instant. The third flash pulses may correspond to the cross-polarized spherical gradient lighting patterns that may illuminate the subject 306 from the left-hand side. In at least one embodiment, the illumination intensity of the third flash pulse triggered by the light source 302A may be greater than the illumination intensity of the third flash pulse triggered by the light source 302B. The set of image capture devices 304A ... 304F may capture six images at the third time-instant based on the illumination of the subject 306, from the left-hand side, with the cross-polarized spherical gradient lighting pattern (via the six third flash pulses).

Similarly, the set of image capture devices 304A ... 304F may capture six images at each of a fourth, a fifth, a sixth, a seventh, and an eighth time-instant. The six images captured at each of the fourth, fifth, sixth, seventh, and eighth time-instants may be based on the illumination of the subject 306, from the right-hand side (by the light source 302B), the top (by the light source 302C), the bottom (by the light source 302D), the front-side (by the light source 302E), and the back-side (by the light source 302F), respectively. The six images, captured at each of the fourth, the fifth, the sixth, the seventh, and the eighth time-instants, may be based on the illumination of the subject 306 with the cross-polarized spherical gradient lighting patterns (via six fourth flash pulses, six fifth flash pulses, six sixth flash pulses, six seventh flash pulses, and six eighth flash pulses, respectively).

It may be noted that an illumination intensity of the fourth flash pulse triggered by the light source 302B (at the fourth time-instant) may be greater than an illumination intensity of the fourth flash pulse triggered by the light source 302A. Similarly, an illumination intensity of the fifth flash pulse triggered by the light source 302C (at the fifth time-instant) may be greater than an illumination intensity of the fifth flash pulse triggered by the light source 302D, while an illumination intensity of the sixth flash pulse triggered by the light source 302D (at the sixth time-instant) may be greater than an illumination intensity of the sixth flash pulse triggered by the light source 302C. Further, an illumination intensity of the seventh flash pulse triggered by the light source 302E (at the seventh time-instant) may be greater than an illumination intensity of the seventh flash pulse triggered by the light source 302F, and an illumination intensity of the eighth flash pulse triggered by the light source 302F (at the eighth time-instant) may be greater than an illumination intensity of the eighth flash pulse triggered by the light source 302E.

Based on the selection of the lighting patterns from the second subset of parallel-polarized spherical gradient lighting patterns, the set of image capture devices 304A ... 304F may capture six images, concurrently, at each of a ninth, a tenth, and an eleventh time-instant. The six images captured at each of the ninth, the tenth, and the eleventh time-instants may be based on an illumination of the subject 306, from the left-hand side (by the light source 302A), the top (by the light source 302C), and the front-side (by the light source 302E), respectively. The six images, captured at each of the ninth, the tenth, and the eleventh time-instants, may be based on illumination of the subject 306 with the parallel-polarized spherical gradient lighting patterns (via six ninth flash pulses, six tenth flash pulses, and six eleventh flash pulses, respectively).

It may be noted that an illumination intensity of the ninth flash pulse triggered by the light source 302A (at the ninth time-instant) may be greater than an illumination intensity of the ninth flash pulse triggered by the light source 302B. Similarly, an illumination intensity of the tenth flash pulse triggered by the light source 302C (at the tenth time-instant) may be greater than an illumination intensity of the tenth flash pulse triggered by the light source 302D. Further, an illumination intensity of the eleventh flash pulse triggered by the light source 302E (at the eleventh time-instant) may be greater than an illumination intensity of the eleventh flash pulse triggered by the light source 302F.

Thus, the set of image capture devices 304A ... 304F may capture 11 sets of images (each set comprising of 6 images) based on the illumination of the subject 306 with the second set of flash pulses (i.e., the six first flash pulses, ..., the six eleventh flash pulses). The second set of flash pulses may correspond to the selected 11 lighting patterns (i.e., the cross-polarized omni-directional lighting pattern, the parallel-polarized omni-directional lighting pattern, the six cross-polarized spherical gradient lighting patterns, and the three parallel-polarized spherical gradient lighting patterns). The second set of flash pulses may, thus, include 66 flash pulses and the set of image capture devices 304A ... 304F may capture 66 images of the subject 306. It may be noted that the subject 306 may manifest a single expression during the capture of the 66 images.

It should be noted that the environment 300 of FIG. 3 is for exemplary purposes and should not be construed to limit the scope of the disclosure.

Figure 4:
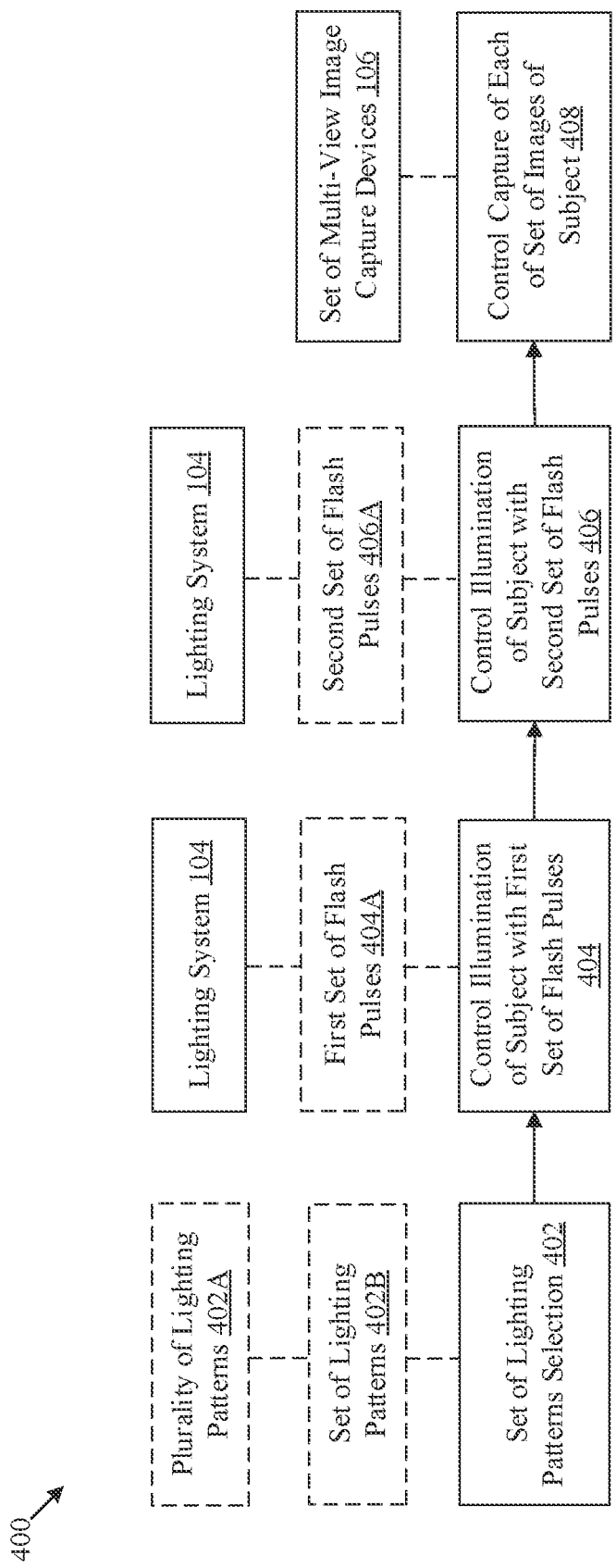
FIG. 4 is a diagram that illustrates an exemplary execution pipeline for control of a lighting system for image capture by use of a set of multi-view image capture devices, in accordance with an embodiment of the disclosure.

FIG. 4 is a diagram that illustrates an exemplary execution pipeline for control of a lighting system for image capture by use of a set of multi-view image capture devices, in accordance with an embodiment of the disclosure. FIG. 4 is explained in conjunction with elements from FIG. 1, FIG. 2, and FIG. 3. With reference to FIG. 4, there is shown an exemplary pipeline 400. The exemplary pipeline 400 may include a set of operations (for example, operations 402 to 408) that may be executed by one or more components of FIG. 1, such as, the electronic device 102. The set of operations may be performed by the electronic device 102 to control the lighting system 104 to trigger flash pulses that correspond to a set of lighting patterns and control the set of multi-view image capture devices 106 to capture images of the subject 114 illuminated by the flash pulses.

At 402, a set of lighting patterns 402B, from a plurality of predefined lighting patterns 402A, may be selected. The circuitry 202 may be configured to select, from the plurality of predefined lighting patterns 402A, the set of lighting patterns 402B to capture images of the subject 114. In accordance with an embodiment, the plurality of predefined lighting patterns 402A may include one or more of an omni-directional lighting pattern, a directional lighting pattern, a cross-polarized lighting pattern, and a parallel-polarized lighting pattern. The selected set of lighting patterns 402B may include a first set of lighting patterns and a second set of lighting patterns. The first set of lighting patterns may include a cross-polarized omni-directional lighting pattern and a parallel-polarized omni-directional lighting pattern. The first set of lighting patterns may be used for shape (for example, 3D facial geometry or mesh) reconstruction and separation of diffuse and specular reflectance components (associated with a facial surface).

The second set of lighting patterns may include a first subset of cross-polarized spherical gradient lighting patterns and a second subset of parallel-polarized spherical gradient lighting patterns. The first subset of cross-polarized spherical gradient lighting patterns may include cross-polarized spherical gradient lighting patterns that may illuminate the subject 114 from a left-hand side, a right-hand side, a top, a bottom, a front-side, and a back-side, of the subject 114. Similarly, the second subset of parallel-polarized spherical gradient lighting patterns may include parallel-polarized spherical gradient lighting patterns that may illuminate the subject 114 from the left-hand side, the right-hand side, the top, the bottom, the front-side, and the back-side, of the subject 114. The second set of lighting patterns may be used for generation of normal maps and height maps.

In accordance with an embodiment, the circuitry 202 may be configured to select the first set of lighting patterns, one or more lighting patterns from the first subset of cross-polarized spherical gradient lighting patterns, and one or more lighting patterns from the second subset of parallel-polarized spherical gradient lighting patterns. The second set of lighting patterns may be used for generation of normal maps and height maps. The quality of the generated normal maps and height maps may depend on number of lighting patterns in the selected set of lighting patterns 402B. For example, the circuitry 202 may select the first set of lighting patterns (i.e., 2 lighting patterns), all lighting patterns from the first subset of cross-polarized spherical gradient lighting patterns (i.e., 6 lighting patterns), and three lighting patterns from the second subset of parallel-polarized spherical gradient lighting patterns. The lighting patterns selected from the second subset may include parallel-polarized spherical gradient lighting patterns that may illuminate the subject 114 from the left-hand side, the top, and the front-side, of the subject 114.

The circuitry 202 may select all the lighting patterns from the first subset of cross-polarized spherical gradient lighting patterns, since diffuse reflectance components in images of the subject 114, captured when the subject 114 is illuminated with the cross-polarized gradient lighting patterns, may not include high-frequency details. Further, in such case, the quality of the images may not be affected by motion of the subject 114 during the capture of the images. The use of all the lighting patterns from the first subset of cross-polarized spherical gradient lighting patterns may maximize the reconstruction quality of the captured images. The circuitry 202 may select the three lighting patterns from the second subset of parallel-polarized spherical gradient lighting patterns, since images of the subject 114, captured when the subject 114 is illuminated with the parallel-polarized spherical gradient lighting patterns, may include the high-frequency details. The circuitry 202 may select at least three lighting patterns from the second subset of parallel-polarized spherical gradient lighting patterns to avoid motion-related blur in an extracted specular reflectance component (that includes high frequency details).

At 404, an illumination of the subject 114 with a first set of flash pulses 404A may be controlled. The subject 114 may be illuminated based on a control of the lighting system 104. The circuitry 202 may be configured to control the lighting system 104, associated with the electronic device 102, to illuminate the subject 114 with the first set of flash pulses 404A. The first set of flash pulses 404A may include a first pulse and a second pulse. An illumination intensity of the first set of flash pulses 404A may increase from a first intensity associated with the first pulse to a second intensity associated with the second pulse. Thus, the first intensity may be lower than the second intensity. For example, the increase in the illumination intensity, from the first intensity to the second intensity, may be a linear increase. The linear increase in the illumination intensity may allow the subject 114 to get acclimatized to the second pulse of the second intensity (i.e., a higher light intensity). In accordance with an embodiment, the first pulse may correspond to a modeling light and the first intensity may correspond to a predefined intensity.

At 406, an illumination of the subject 114 with a second set of flash pulses 406A may be controlled. The subject 114 may be illuminated based on a control of the lighting system 104. The circuitry 202 may be configured to control the lighting system 104 to illuminate the subject 114 with the second set of flash pulses 406A. In accordance with an embodiment, the second set of flash pulses 406A may correspond to the selected set of lighting patterns 402B. Thus, the second set of flash pulses 406A may correspond to the first set of lighting patterns, the first subset of cross-polarized spherical gradient lighting patterns, and the selected one or more parallel-polarized lighting patterns.

In some embodiments, the second set of flash pulses 406A may correspond to a linearly polarized lighting (i.e., horizontally polarized lighting or vertically polarized lighting). The circuitry 202 may be configured to control the set of multi-view image capture devices 106 to transform, based on capture of the images of the subject 114, the linearly polarized lighting to the first set of lighting patterns (i.e., the cross or parallel polarized omni-directional lighting patterns) or the second set of lighting patterns (i.e., the cross or parallel polarized spherical gradient lighting patterns). For example, the second set of flash pulses 406A that correspond to the horizontally polarized lighting may be transformed to parallel-polarized omni-directional or parallel-polarized spherical gradient lighting patterns. Similarly, the second set of flash pulses 406A that correspond to the vertically polarized lighting may be transformed to cross-polarized omni-directional or cross-polarized spherical gradient lighting patterns.

In accordance with an embodiment, the illumination intensity of the second set of flash pulses 406A that correspond to the first set of lighting patterns (i.e., the cross polarized or parallel polarized omni-directional lighting patterns) may be equal to the second intensity. The illumination intensity of the second set of flash pulses 406A, that correspond to the second set of lighting patterns, may vary based on a selected lighting pattern of the second set of lighting patterns. For example, an illumination intensity of a first flash pulse of the second set of flash pulses 406A, triggered by the light source 104A, may be greater than an illumination intensity of a second flash pulse of the second set of flash pulses 406A triggered by the light source 1048. In a first scenario, if the light source 104A is positioned at a left-hand side of the subject 114 and the light source 104B is positioned at a right-hand side of the subject 114, the first flash pulse and the second flash pulse may correspond to the cross-polarized or parallel-polarized spherical gradient lighting pattern that illuminates the subject 114 from the left-hand side. In a second scenario, if the light source 104A is positioned at the right-hand and the light source 1048 is positioned at the left-hand side, the first flash pulse and the second flash pulse may correspond to the cross-polarized or parallel-polarized spherical gradient lighting pattern that illuminates the subject 114 from the right-hand side. Similarly, in other scenarios, the first flash pulse and the second flash pulse correspond to the cross-polarized or parallel-polarized spherical gradient lighting pattern that illuminates the subject 114 from the top, the bottom, the front-side or the back-side, of the subject 114.

At 408, a capture of each of the set of images of the subject 114 may be controlled. Each of the set of images may be captured via a control of the set of multi-view image capture devices 106. The circuitry 202 may be configured to control the set of multi-view image capture devices 106, associated with the electronic device 102, to capture each of the set of images of the subject 114, based on the illumination of the subject 114 with the second set of flash pulses 406A. The second set of flash pulses 406A may correspond to the (selected) set of lighting patterns 402B. Therefore, the circuitry 202 may control the set of multi-view image capture devices 106 to capture each of the set of images of the subject 114 based on illumination of the subject 114 with each of the lighting patterns of the selected set of lighting patterns 402B, via the second set of flash pulses 406A. For example, the selected set of lighting patterns 402B may include 11 lighting patterns, viz., the cross polarized omni-directional lighting pattern, the parallel polarized omni-directional lighting pattern, the six cross-polarized spherical gradient lighting patterns, and the three parallel-polarized spherical gradient lighting patterns. The circuitry 202 may control the set of multi-view image capture devices 106 to capture 11 sets of images of the subject 114. Each set of the 11 sets of images may be captured based on illumination of the subject 114 with a lighting pattern of the 11 lighting patterns. Further, each set of the 11 sets of images may include 6 images, one from each capture direction (such as, the left-side, the right-side, the top, the bottom, the front-side, and the back-side) with respect to the subject 114.

In accordance with an embodiment, the number of images in each of the 11 sets of images may be based on a capture mode associated with the set of multi-view image capture devices 106 and number of image capture devices in the set of multi-view image capture devices 106. The capture mode may correspond to a single-shot mode or a burst mode. In the single-shot mode, each image capture device of the set of multi-view image capture devices 106 may capture a single image during a time interval between opening and closing of a shutter of the image capture device (or a time interval during which a shutter of the image capture device may be in an open state). The circuitry 202 may be further configured to synchronize an opening and a closing of the shutters of all image capture devices in the set of multi-view image capture devices 106. The circuitry 202 may control each image capture device of the set of multi-view image capture devices 106 to set the time interval. The time interval may correspond to a shutter speed associated with each image capture device of the set of multi-view image capture devices 106.

In accordance with an embodiment, the circuitry 202 may set the shutter speed associated with each image device of the set of multi-view image capture devices 106, based on a capture mode (i.e., the single-shot mode or the burst mode) associated with the capture of each of the set of images. For example, for the single shot mode, the shutter speed associated with each image capture device of the set of multi-view image capture devices 106 may be set as $\frac{1}{60}^{th}$ of a second. The circuitry 202 may control a light source (for example, the light source 104A) of the lighting system 104 to trigger a flash pulse of the second set of flash pulses 406A that corresponds to the cross-polarized omni-directional lighting pattern. The flash pulse may be triggered during the time interval (i.e., $\frac{1}{60}^{th}$ of a second) to capture an image. In accordance with an embodiment, the circuitry 202 may set a delay and a flash duration associated with the lighting system 104 (i.e., light sources 104A ... 104N), based on the shutter speed (associated with each image capture device of the set of multi-view image capture devices 106). For example, in case the flash duration is set as $\frac{1}{1000}^{th}$ of a second, the delay may be set as $\frac{1}{120}^{th}$ of a second. The delay may ensure that the light source 104A triggers the flash pulse at the center (for example, at $\frac{1}{30}^{th}$ of a second) of the time interval (i.e., at $\frac{1}{60}^{th}$ of a second).

In accordance with an embodiment, the circuitry 202 may be configured to synchronize the lighting system 104 and the set of multi-view image capture devices 106 to capture each of the set of images of the subject 114, based on the delay and flash duration. For example, the circuitry 202 may synchronize the light source 104A of the lighting system 104 and the image capture device 106A of the set of multi-view image capture devices 106. The circuitry 202 may control the image capture device 106A to capture an image of the subject 114, illuminated with the flash pulse (of the second set of flash pulses 406A) that corresponds to the cross-polarized omni-directional lighting pattern. The flash pulse may be triggered at the center of the time interval between the opening and closing of the shutter associated with the image capture device 106A.

Similarly, each of the other image capture devices of the set of multi-view image capture devices 106 may capture an image of the subject 114 based on an illumination of the subject 114 with flash pulses (of the second set of flash pulses 406A) that correspond to the cross-polarized omni-directional lighting pattern. The capture of the images of the subject 114 may be based on a synchronization of the light sources 104B ... 104N of the lighting system 104 and the image capture devices 106B ... 106N. Each of the light sources 104B ... 104N may trigger the flash pulses of the second set of flash pulses 406A at the center of the time interval between opening and closing of the shutters associated with each of the image capture devices 106B ... 106N. Thus, the set of multi-view image capture devices 106 may capture 'N' images of the subject 114 in the single-shot mode, based on the illumination of the subject 114 with the second set of flash pulses 406A that correspond to the cross-polarized omni-directional lighting pattern.

Similarly, for each of the remaining 10 lighting patterns of the selected set of lighting patterns 402B, the circuitry 202 may be configured to control the set of multi-view image capture devices 106 to capture 'N' images of the subject 114 in the single-shot mode. The set of multi-view image capture devices 106 may capture a total of '11*N' images of the subject 114 in the single-shot mode.

In the burst mode, each image capture device of the set of multi-view image capture devices 106 may capture a plurality of images in a plurality of time intervals during which the shutter of the image capture device is in the open state. The plurality of images may be captured based on triggering of a plurality of flash pulses of the second set of flash pulses 406A that correspond to a lighting pattern of the selected set of lighting patterns 402B. The circuitry 202 may set the shutter speed (that corresponds to the time interval) associated with each image device of the set of multi-view image capture devices 106. For example, the shutter speed may be set as $1/125^{th}$ of a second.

The set value may be an optimal value since a shutter speed greater than $1/125^{th}$ of a second may affect brightness of captured images. Further, the image capture devices of the set of multi-view image capture devices 106 may not operate efficiently in the burst mode if the shutter speed is less than $1/125^{th}$ of a second. For example, synchronization between the image capture devices of the set of multi-view image capture devices 106 may be affected if the shutter speed is less than $1/125^{th}$ of a second (i.e., time interval, during which the shutter is in the open state, is greater than $1/125^{th}$ of a second). This is because duration of in-camera (i.e., within-image capture device) image processing may be directly proportional to the time interval. An increase in the duration of in-camera image processing (due to a longer time interval (greater than $1/125^{th}$ of a second)) may cause mis-synchronization between the image capture devices of the set of multi-view image capture devices 106. On the other hand, synchronization between light sources (for example, the light source 104A) of the lighting system 104 and image capture devices (for example, the image capture device 106A) of the set of multi-view image capture devices 106 may be affected, if the shutter speed is greater than $1/125^{th}$ of a second (i.e., time interval, during which the shutter is in the open state, is less than $1/125^{th}$ of a second). One or more image capture devices of the set of multi-view image capture devices 106 may miss the flash pulses of the second set of flash pulses 406A for the capture of the sets of images.

The circuitry 202 may control a light source (for example, the light source 104A) of the lighting system 104 to trigger a plurality (for example, a burst) of flash pulses of the second set of flash pulses 406A, that correspond to the cross-polarized omni-directional lighting pattern, in a plurality of time intervals. The shutters of each of the image capture devices of the set of multi-view image capture devices 106 may be in the open state during each of the plurality of time intervals. Each flash pulse of the plurality of flash pulses may be triggered during each time interval (i.e., $1/125^{th}$ of a second) to capture an image. For example, the light source 104A may trigger three flash pulses, that correspond to the cross-polarized omni-directional lighting pattern, for capture of three images during three time intervals. The flash duration may be set as, for example, $1/1000^{th}$ of a second. The delay may be set such that each of the three flash pulses are triggered at the center (i.e., $1/250^{th}$ of a second) of each of the corresponding time intervals (i.e., $1/125^{th}$ of a second).

The circuitry 202 may control the image capture device 106A to capture three images of the subject 114, illuminated with the three flash pulses (of the second set of flash pulses 406A) that correspond to the cross-polarized omni-directional lighting pattern. The three flash pulses may be triggered within the three time intervals during which the shutter associated with the image capture device 106A is in the open state. Similarly, each of the other image capture devices of the set of multi-view image capture devices 106 may capture three images of the subject 114 based on illumination of the subject 114 with three flash pulses (of the second set of flash pulses 406A) that correspond to the cross-polarized omni-directional lighting pattern. Thus, the set of multi-view image capture devices 106 may capture '3*N' images of the subject 114 in the burst mode, based on an illumination of the subject 114 with the second set of flash pulses 406A that correspond to the cross-polarized omni-directional lighting pattern.

Similarly, for each of the remaining 10 lighting patterns of the selected set of lighting patterns 402B, the circuitry 202 may be configured to control the set of multi-view image capture devices 106 to capture "3*N" images of the subject 114 in the burst mode. The set of multi-view image capture devices 106 may capture a total of "33*N" images of the subject 114 in the burst mode. It may be noted that the "11*N" images (captured in the single shot mode) or the "33*N" images (captured in the burst mode) of the subject 114 may be captured based on a certain facial expression of the subject 114. The facial expression may lead to movement of facial features or manifestation of an emotion.

In accordance with an embodiment, the circuitry 202 may be configured to control an auto-focus setting associated with each image capture device of the set of multi-view image capture devices 106. The circuitry 202 may control the set of multi-view image capture devices 106 to the capture of each of the set of images of the subject 114 based on the control of the auto-focus setting. For example, the auto-focus setting of each of the image-capture devices of the set of multi-view image capture devices 106 may be controlled, prior to the capture of each of the set of images of the subject 114. The auto-focus setting may be enabled in each of the image-capture devices based on a coupling of circular polarizers to the lenses (for example, 85 millimeter lenses in a F1.8 aperture) of each of the image-capture devices.

In accordance with an embodiment, the auto-focus setting may correspond to a per-capture auto-focus, a per-session auto-focus, or a per-frame auto-focus.

If the auto-focus setting corresponds to a per-capture auto-focus, the circuitry 202 may control the auto-focus setting (associated with each image capture device of the set of multi-view image capture devices 106) each time prior to the capture of each of a set of images of the subject 114 that manifests certain a facial expression. For example, the auto-focus setting may be controlled for a first time, prior to the capture of the "11*N" or "33*N" images of the subject 114 that manifests a first facial expression. Once the "11*N" or "33*N" images are captured, the auto-focus setting may be controlled for a second time. The auto-focus setting may be controlled for the second time, for capture of another "11*N" or "33*N" images of the subject 114 that manifests a second facial expression. Thus, the auto-focus setting of each of the image capture devices is retained for capture of each set of images, based on the illumination of the subject 114 with each of the 11 selected lighting patterns. For the per-capture auto-focus, the circuitry 202 may accommodate a potential head motion (i.e., a movement of the head of the subject 114) during the capture of "11*N" or "33*N" images of the subject 114 that manifests a particular expression. The circuitry 202 may be further configured to perform a post rigid alignment to compensate for changes in one or more intrinsic parameters (e.g., focal length of an image capture device of the set of multi-view image capture devices 106, distortion associated with lens of the image capture device, a position of sensors in the image capture device, or the like). The one or more intrinsic parameters may change each time the auto-focus setting is controlled, prior to the capture of each of the set of images of the subject 114 that manifests a particular expression.

If the auto-focus setting corresponds to a per-session auto-focus, the circuitry 202 may control the auto-focus setting (associated with each image capture device of the set of multi-view image capture devices 106), once prior to the capture of each of the set of images of the subject 114 that manifests a set of facial expressions. For example, the auto-focus setting, controlled prior to the capture of the "11*N" or "33*N" images of the subject 114 that manifests a first facial expression, may be retained for the capture of the corresponding "11*N" or "33*N" images of the subject 114 that manifest the second facial expression.

If the auto-focus setting corresponds to a per-frame auto-focus, the circuitry 202 may control the auto-focus setting (associated with each image capture device of the set of multi-view image capture devices 106), each time prior to the capture of a set of images of the subject 114 illuminated with a lighting pattern of the selected set of lighting patterns 402B. For example, the auto-focus setting may be controlled for a first time, prior to the capture of the "N" or "3*N" images of the subject 114 illuminated with a first lighting pattern of the 11 selected lighting patterns, wherein a facial expression may be manifested. Once the "N" or "3*N" images are captured, the auto-focus setting may be controlled for a second time. For example, the auto-focus setting may be controlled for the second time, for capture of another "N" or "3*N" images of the subject 114 illuminated with a second lighting pattern of the 11 lighting patterns, wherein the same facial expression may be manifested.

In accordance with an embodiment, the circuitry 202 may be configured to receive a first indication that a first set of images is captured by the set of multi-view image capture devices 106 based on an illumination of the subject 114 with a first lighting pattern of the selected set of lighting patterns 402B. The first indication may be received based on an input from a user associated with the set of multi-view image capture devices 106. In addition, or alternatively, the first indication may be received automatically from at least one of the set of multi-view image capture devices 106 or the lighting system 104. The circuitry 202 may be further configured to control the lighting system 104 to illuminate the subject 114 with the first pulse of the first set of flash pulses 404A, associated with the first intensity, based on the received first indication. The subject 114 may be illuminated by a flash pulse of the second set of flash pulses 406A, that corresponds to the first lighting pattern, prior to the reception of the first indication. The flash pulse may be associated with a second intensity that may be greater than the first intensity. Once the first set of images is captured, the circuitry 202 may respond to the received first indication and control of the lighting system 104 to trigger the first pulse (of lower intensity compared to the intensity of the flash pulse) via each of the light sources 104A . . . 104N. The triggering of the first pulse may ensure that the subject 114 is not exposed to higher intensity light when the set of multi-view image capture devices 106 are not involved in image capture.

In accordance with an embodiment, the circuitry 202 may be configured to receive a second indication of an initiation of capture of a second set of images by use of the set of multi-view image capture devices 106. The second indication may be received based on an input from a user associated with the set of multi-view image capture devices 106. In addition, or alternatively, the second indication may be received automatically from at least one of the set of multi-view image capture devices 106 or the lighting system 104. Based on the received second indication, the circuitry 202 may be configured to control the lighting system 104 to illuminate the subject 114 with the first set of flash pulses 404A. The first set of flash pulses 404A may start with the first pulse of a lower intensity and end with the second pulse of a higher intensity than the first pulse. The circuitry 202 may be further configured to control the lighting system 104 to illuminate the subject 114 with the second set of flash pulses 406A, based on the illumination of the subject 114 with the first set of flash pulses 404A (that may culminate with the second pulse). The second set of flash pulses 406A may be triggered after the illumination of the subject 114 with the second pulse (i.e., after the subject 114 is acclimatized to the second intensity associated with the second pulse and the second set of flash pulses 406A). The second set of flash pulses 406A may correspond to a second lighting pattern of the selected set of lighting patterns 402B. The circuitry 202 may be further configured to control the set of multi-view image capture devices 106 to capture a second image of the set of images, based on the illumination of the subject 114 with the second set of flash pulses 406A.

Figure 5A:
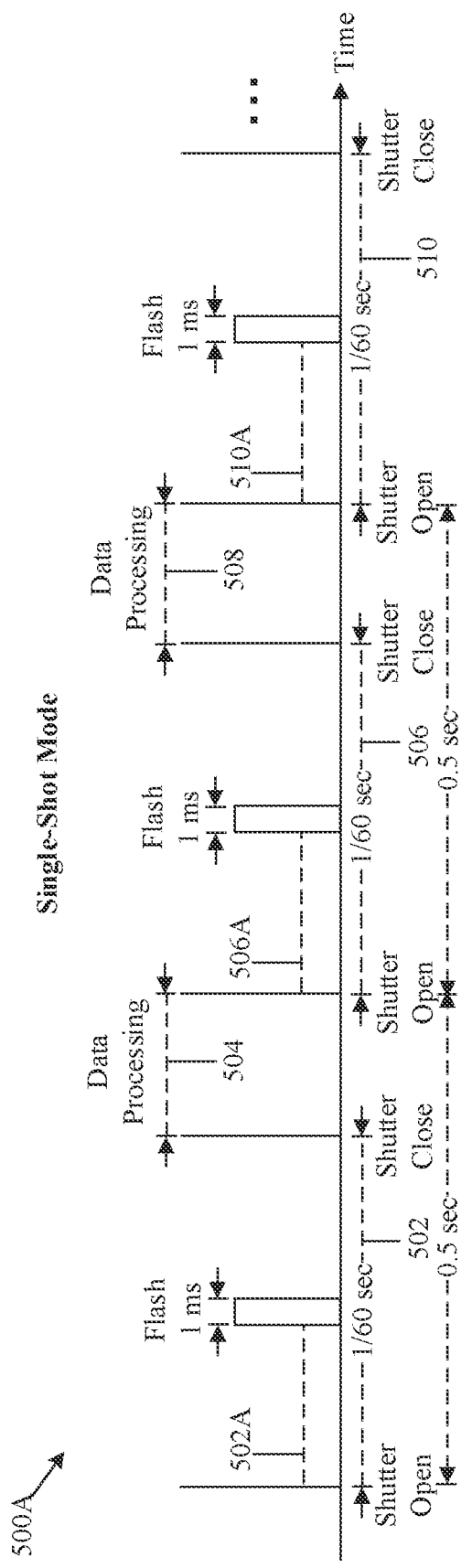
FIG. 5A is an exemplary first timing diagram that illustrates synchronization between a lighting system and a set of multi-view image capture devices for image capture in a single-shot mode, in accordance with an embodiment of the disclosure.

FIG. 5A is an exemplary first timing diagram that illustrates synchronization between a lighting system and a set of multi-view image capture devices for image capture in a single-shot mode, in accordance with an embodiment of the disclosure. FIG. 5A is explained in conjunction with elements from FIG. 1, FIG. 2, FIG. 3, and FIG. 4. With reference to FIG. 5A, there is shown an exemplary timing diagram 500A. In the exemplary timing diagram 500A there is shown a timeline that indicates time instants at which a shutter associated with each of the image capture devices (of the set of multi-view image capture devices 106) may be opened or closed. The timeline further indicates time instants at which flash pulses may be triggered, by each of the light sources of the lighting system 104, based on the time instants at which the shutter may open and close. The circuitry 202 may synchronize the triggering of the flash pulse with the opening and closing of the shutter for capture of images of the subject 114.

In accordance with an embodiment, the capture mode associated with the set of multi-view image capture devices 106 may be the single-shot mode. In the single-shot mode, each image capture device of the set of multi-view image capture devices 106 may capture a single image during a time interval between an opening and a closing of a shutter of the image capture device. For example, during a first time interval 502, an image capture device (for example, the image capture device 106A) of the set of multi-view image capture devices 106 may capture an image of the subject 114. A shutter associated with the image capture device 106A may be in an open state during the first time interval 502 to enable the capture. The first time interval 502 may correspond to a shutter speed of the shutter associated with the image capture device 106. The circuitry 202 may set the shutter speed as $\frac{1}{60}^{th}$ of a second.

The circuitry 202 may be configured to synchronize the lighting system 104 with the set of multi-view image capture devices 106. The synchronization may allow each of the light sources of the lighting system 104 to trigger flash pulses based on the opening of the shutters associated with the image capture devices of the set of multi-view image capture devices 106. For example, the light source 104A may trigger a flash pulse during the first time interval 502.

The flash pulse may correspond to a first lighting pattern of the selected set of predefined lighting patterns 402A. The image capture device 106A may capture the image of the subject 114 (during the first time interval 502) based on an illumination of the subject 114 (with the first lighting pattern of the selected set of predefined lighting patterns 402A) via the flash pulse triggered by the light source 104A.

In accordance with an embodiment, the circuitry 202 may be configured to set a delay and a flash duration associated with the lighting system 104, based on the shutter speed. For example, the circuitry 202 may set a delay 502A and configure the flash duration as 1 millisecond (or $\frac{1}{1000}^{th}$ of a second). The delay 502A may be set based on the shutter speed (or the first time interval 502). The circuitry 202 may control the light source 104A to trigger the flash pulse of 1 millisecond duration with a delay 502A with respect to the opening of the shutter associated with the image capture device 106A. The captured image may be processed within a time interval 504. The first time interval 502 and the time interval 504 may span 0.5 seconds.

In accordance with an embodiment, the circuitry 202 may be further configured to control the image capture device 106A to capture an image of the subject 114 during a second time interval 506, based on an illumination of the subject 114 with a second lighting pattern of the selected set of lighting patterns 402B. The image captured during the second time interval 506 may be processed at a time interval 508. The circuitry 202 may be further configured to control the image capture device 106A to capture an image of the subject 114 during a third time interval 510 based on an illumination of the subject 114 with a third lighting pattern of the selected set of lighting patterns, and so on.

Figure 5B:
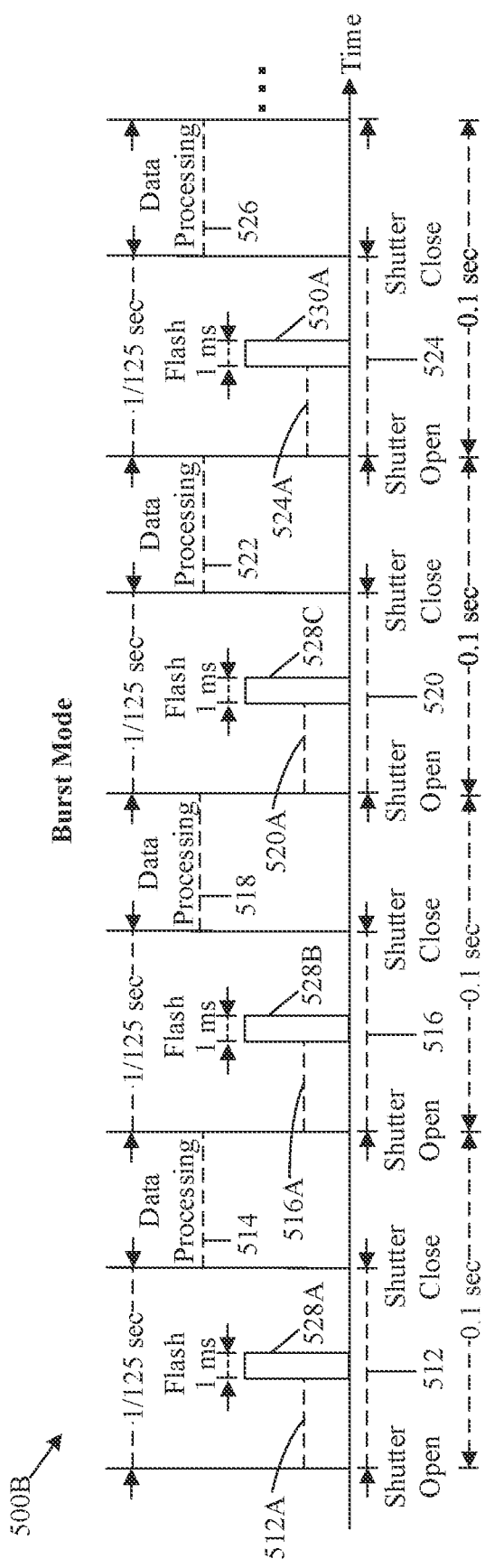
FIG. 5B is an exemplary second timing diagram that illustrates synchronization between a lighting system and a set of multi-view image capture devices for image capture in a burst mode, in accordance with an embodiment of the disclosure.

FIG. 5B is an exemplary second timing diagram that illustrates synchronization between a lighting system and a set of multi-view image capture devices for image capture in a burst mode, in accordance with an embodiment of the disclosure. FIG. 5B is explained in conjunction with elements from FIG. 1, FIG. 2, FIG. 3, FIG. 4, and FIG. 5A. With reference to FIG. 5B, there is shown an exemplary timing diagram 500B. In the exemplary timing diagram 500B there is shown a timeline that indicates time instants at which a shutter associated with each of the image capture devices (of the set of multi-view image capture devices 106) may be opened or closed. The timeline further indicates time instants at which flash pulses may be triggered, by each light source of the lighting system 104, based on the opening and closing of the shutter in a burst mode.

In accordance with an embodiment, in the burst mode each image capture device of the set of multi-view image capture devices 106 may capture multiple images during multiple time intervals that span an opening and a closing of a shutter of the image capture device. For example, the image capture device 106A may capture three images (viz., a first image during a time interval 512, a second image during a time interval 516, and a third image during a time interval 520) when the shutter associated with the image capture device 106A may be in the open state. The time intervals 512, 516, and 520, may correspond to the shutter speed that may be set as $\frac{1}{125}^{th}$ of a second. The synchronization between the lighting system 104 and the set of multi-view image capture devices 106 may allow the light source 104A to trigger three flash pulses, that may correspond to a first lighting pattern of the selected set of lighting patterns 402B. A first flash pulse 528A may be triggered during the time interval 512 for capture of the first image, a second flash pulse 528B may be triggered during the time interval 516 for capture of the second image, and a third flash pulse 528C may be triggered during the time interval 520 for capture of the third image.

The image capture device 106A may capture the three images of the subject 114 based on an illumination of the subject 114 (with the first lighting pattern) via the three flash pulses (i.e., the first flash pulse 528A, the second flash pulse 528B, and the third flash pulse 528C) triggered by the light source 104A. The first flash pulse 528A, the second flash pulse 528B, and the third flash pulse 528C may be of same duration (for example, 1 millisecond). The first image may be processed within a time interval 514. The second image may be processed within a time interval 518. The third image may be processed within a time interval 522. The time interval 512 (or the time intervals 516 and 520) and the time interval 514 (or the time intervals 518 and 522) may span 0.1 seconds.

In accordance with an embodiment, the circuitry 202 may be configured to set flash durations associated with the three flash pulses. For example, the flash duration of each of the three flash pulses may be set as 1 millisecond ($\frac{1}{1000}^{th}$ of a second). The circuitry 202 may be configured to set a delay 512A for the first flash pulse 528A, a delay 516A for the second flash pulse 528B, and a delay 520A for the third flash pulse 528C. The delays 512A, 516A, and 520A, may be of same duration. The circuitry 202 may control the light source 104A to trigger the first flash pulse 528A of 1 millisecond duration with a delay 512A with respect to the opening of the shutter associated with the image capture device 106A. Similarly, the circuitry 202 may set delays 516A and 520A to control the light source 104A to trigger the second flash pulse 528B and the third flash pulse 528C, respectively with respect to the opening of the shutter associated with the image capture device 106A.

In accordance with an embodiment, the circuitry 202 may be further configured to control the image capture device 106A to capture three images of the subject 114 based on an illumination of the subject 114 (with the second lighting pattern of the selected set of lighting patterns 402B) via three flash pulses. For example, the image capture device 106A may capture an image during a time interval 524 when the shutter associated with the image capture device 106A may be in the open state. A flash pulse 530A may be triggered during the time interval 524 for capturing of the image. The image capture device 106A may capture two additional images based on an illumination of the subject 114 (with the second lighting pattern) via two flash pulses. The two flash pulses may be triggered during successive time intervals that follow the time interval 524.

Similarly, the circuitry 202 may be further configured to control the image capture device 106A to capture three images of the subject 114 based on an illumination of the subject 114 with each of the other lighting patterns of the selected set of lighting patterns 402B. The circuitry 202 may be further configured to control each of the image capture devices of the set of multi-view image capture devices 106 to capture three images of the subject 114 based on an illumination of the subject 114 with each of the lighting patterns of the selected set of lighting patterns 402B.

It should be noted that the timing diagrams 500A and 500B of FIGS. 5A and 5B are for exemplary purposes and should be construed to limit the scope of the disclosure.

Figure 6:
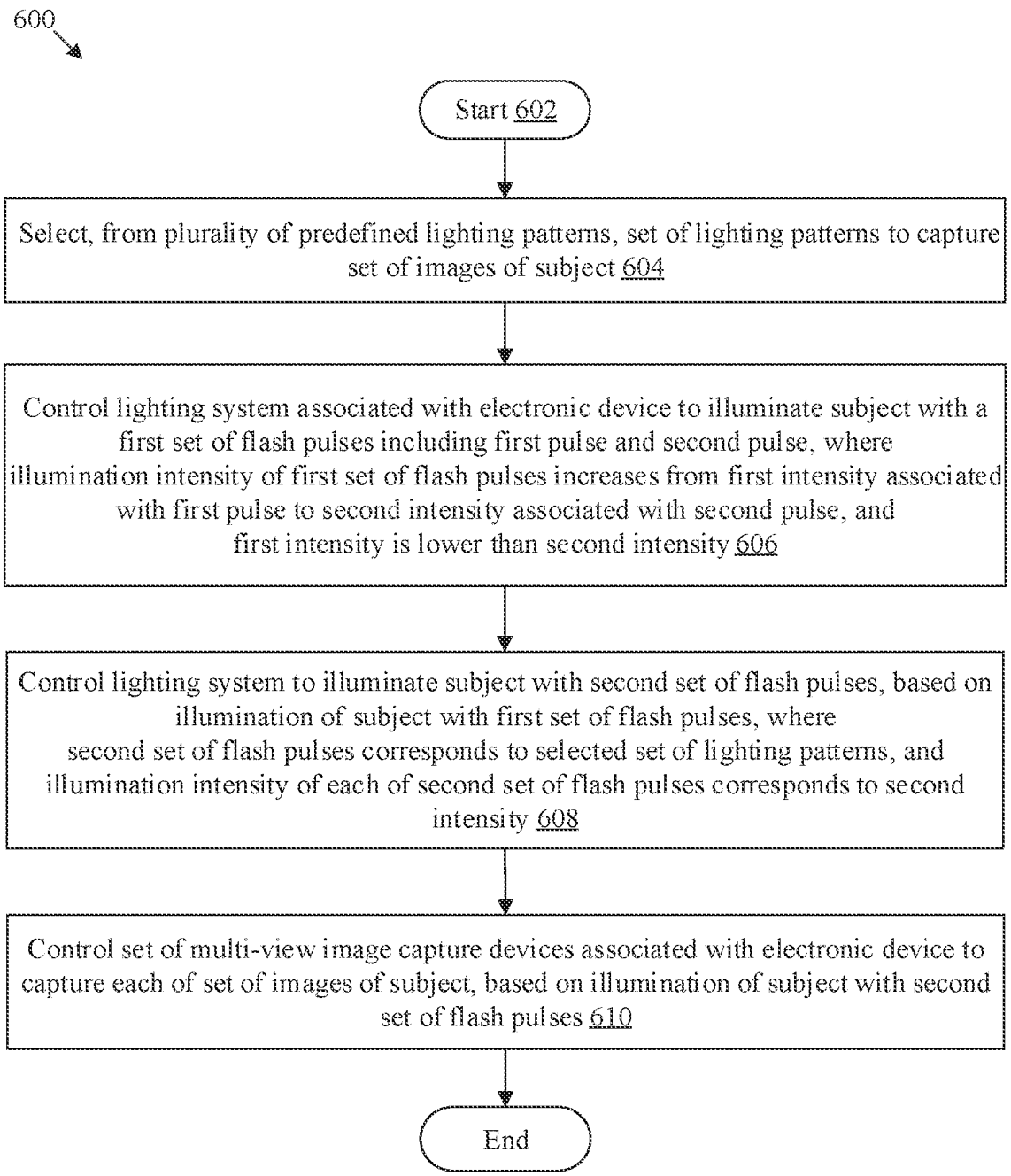
FIG. 6 is a flowchart that illustrates operations for an exemplary method for control of a lighting system for image capture by use of multi-view image capture devices, in accordance with an embodiment of the disclosure.

FIG. 6 is a flowchart that illustrates operations for an exemplary method for control of a lighting system for image capture by use of multi-view image capture devices, in accordance with an embodiment of the disclosure. FIG. 6 is explained in conjunction with elements from FIGS. 1, 2, 3, 4, 5A, and 5B. With reference to FIG. 6, there is shown a flowchart 600. The operations from 602 to 610 may be implemented by any computing system, such as, by the electronic device 102 of FIG. 1. The operations may start at 602 and may proceed to 604.

At 604, a set of lighting patterns, from a plurality of predefined lighting patterns, may be selected to capture a set of images of the subject 114. In at least one embodiment, the circuitry 202 may be configured to select, from the plurality of predefined lighting patterns, the set of lighting patterns to capture the set of images of the subject 114. The details of selection of the set of lighting patterns from the plurality of predefined lighting patterns, are described, for example, in FIG. 1, FIG. 3, and FIG. 4 (at 402).

At 606, the lighting system 104 associated with the electronic device 102 may be controlled to illuminate the subject 114 with a first set of flash pulses including a first pulse and a second pulse, wherein an illumination intensity of the first set of flash pulses may increase from a first intensity associated with the first pulse to a second intensity associated with the second pulse, and the first intensity may be lower than the second intensity. In at least one embodiment, the circuitry 202 may be configured to control the lighting system 104 associated with the electronic device 102 to illuminate the subject 114 with a first set of flash pulses including the first pulse and the second pulse. An illumination intensity of the first set of flash pulses may increase from a first intensity associated with the first pulse to a second intensity associated with the second pulse, and the first intensity may be lower than the second intensity. The details of control of the lighting system 104 to illuminate the subject 114 with the first set of flash pulses are described, for example, in FIG. 1, FIG. 3, and FIG. 4 (step 404).

At 608, the lighting system 104 may be controlled to illuminate the subject 114 with a second set of flash pulses, based on the illumination of the subject 114 with the first set of flash pulses, wherein the second set of flash pulses may correspond to the selected set of lighting patterns, and the illumination intensity of each of the second set of flash pulses may correspond to the second intensity. In at least one embodiment, the circuitry 202 may be configured to control the lighting system 104 to illuminate the subject 114 with the second set of flash pulses, based on the illumination of the subject 114 with the first set of flash pulses. The second set of flash pulses may correspond to the selected set of lighting patterns, and the illumination intensity of each of the second set of flash pulses may correspond to the second intensity. The details of control of the lighting system 104 to illuminate the subject 114 with the second set of flash pulses, are described, for example, in FIG. 1, FIG. 3 and FIG. 4 (step 406).

At 610, the set of multi-view image capture devices 106 associated with the electronic device 102 may be controlled to capture each of the set of images of the subject 114, based on the illumination of the subject 114 with the second set of flash pulses. In at least one embodiment, the circuitry 202 may be configured to control the set of multi-view image capture devices 106 associated with the electronic device 102 to capture each of the set of images of the subject 114, based on the illumination of the subject 114 with the second set of flash pulses. The details of control of the set of multi-view image capture devices 106 to capture the set of images of the subject 114, are described, for example, in FIG. 1, FIG. 3, and FIG. 4 (step 408). Control may pass to end.

Although the flowchart 600 is illustrated as discrete operations, such as 604, 606, 608, and 610, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (such as the electronic device 102). The computer-executable instructions may cause the machine and/or computer to perform operations that include selection, from a plurality of predefined lighting patterns, a set of lighting patterns to capture a set of images of a subject 114. The operations may further include control of a lighting system 104 associated with the electronic device 102 to illuminate the subject 114 with a first set of flash pulses including a first pulse and a second pulse. An illumination intensity of the first set of flash pulses may increase from a first intensity associated with the first pulse to a second intensity associated with the second pulse. The first intensity may be lower than the second intensity. The operations may further include control of the lighting system 104 to illuminate the subject 114 with a second set of flash pulses, based on the illumination of the subject 114 with first set of flash pulses. The second set of flash pulses may correspond to the selected set of lighting patterns. The illumination intensity of each of the second set of flash pulses may correspond to the second intensity. The operations may further include control of a set of multi-view image capture devices 106 associated with the electronic device 102 to capture each of the set of images of the subject 114, based on the illumination of the subject 114 with the second set of flash pulses.

Exemplary aspects of the disclosure may include an electronic device (such as, the electronic device 102 of FIG. 1) that may include circuitry (such as, the circuitry 202), that may be communicatively coupled to the electronic device (such as, the electronic device 102 of FIG. 1). The circuitry 202 may be configured to select, from a plurality of predefined lighting patterns, a set of lighting patterns to capture a set of images of a subject (e.g., the subject 114). The plurality of predefined lighting patterns may correspond to one or more of an omni-directional lighting pattern, a directional lighting pattern, a cross-polarized lighting pattern, or a parallel-polarized lighting pattern. The selected set of lighting patterns may correspond to a first set of lighting patterns for shape reconstruction, or a second set of lighting patterns for normal and height map generation. The first set of lighting patterns may include a cross-polarized omni-directional lighting pattern or a parallel-polarized omni-directional lighting pattern. The second set of lighting patterns may include a cross-polarized lighting pattern to illuminate the subject 114 from a left-hand side of the subject 114, a parallel-polarized lighting pattern to illuminate the subject from the left-hand side, a cross-polarized lighting pattern to illuminate the subject 114 from a right-hand side of the subject 114, a parallel-polarized lighting pattern to illuminate the subject from the right-hand side, a cross-polarized lighting pattern to illuminate the subject from a top of the subject 114, a parallel-polarized lighting pattern to illuminate the subject 114 from the top, a cross-polarized lighting pattern to illuminate the subject from a bottom of the subject 114, a parallel-polarized lighting pattern to illuminate the subject from the bottom, a cross-polarized lighting pattern to illuminate the subject 114 from a front-side of the subject 114, a parallel-polarized lighting pattern to illuminate the subject 114 from the front-side, a cross-polarized lighting pattern to illuminate the subject 114 from a back-side of the subject 114, or a parallel-polarized lighting pattern to illuminate the subject 114 from the back-side.

The circuitry 202 may be further configured to control a lighting system 104 associated with the electronic device 102 to illuminate the subject 114 with a first set of flash pulses including a first pulse and a second pulse. An illumination intensity of the first set of flash pulses increases from a first intensity associated with the first pulse to a second intensity associated with the second pulse. The first intensity may be lower than the second intensity. The first pulse may correspond to a modeling light and the first intensity may correspond to a predefined intensity. The circuitry 202 may be further configured to control the lighting system 104 to illuminate the subject 114 with a second set of flash pulses, based on the illumination of the subject 114 with the first set of flash pulses. The second set of flash pulses may correspond to the selected set of lighting patterns. The illumination intensity of each of the second set of flash pulses may correspond to the second intensity. The circuitry 202 may be further configured to control a set of multi-view image capture devices (e.g., the set of multi-view image capture devices 106), associated with the electronic device 102, to capture each of the set of images of the subject 114, based on the illumination of the subject 114 with the second set of flash pulses.

In accordance with an embodiment, the circuitry 202 may be further configured to determine a shutter speed associated with each of the set of multi-view image capture devices 106, based on a capture mode associated with the capture of the set of images. The circuitry 202 may be further configured to determine a delay and a flash duration associated with the lighting system 104, based on the determined shutter speed. The circuitry 202 may be further configured to synchronize the lighting system 104 and the set of multi-view image capture devices 106 to capture the set of images of the subject 114, based on the determined delay and flash duration. The capture mode may be a single-shot mode or a burst mode.

In accordance with an embodiment, the circuitry 202 may be further configured to control an auto-focus setting associated with each of the set of multi-view image capture devices 106. The circuitry 202 may be further configured to control the set of multi-view image capture devices 106 to capture the set of images of the subject 114 further based on the control of the camera auto-focus setting. The auto-focus setting may correspond to a per-capture auto-focus, a per-session auto-focus, or a per-frame auto-focus.

In accordance with an embodiment, the circuitry 202 may be further configured to receive a first indication that a first image from the set of images is captured by the set of multi-view image capture devices 106. The circuitry 202 may be further configured to. The circuitry 202 may be further configured to control the lighting system 104 to illuminate the subject 114 with the first pulse associated with the first intensity, based on the received first indication.

In accordance with an embodiment, the circuitry 202 may be further configured to receive a second indication of an initiation of capture of a second image from the set of images by the set of multi-view image capture devices 106. The circuitry 202 may be further configured to control the lighting system 104 to illuminate the subject 114 with the first set of flash pulses, based on the received second indication. The circuitry 202 may be further configured to control the lighting system 104 to illuminate the subject 114 with the second set of flash pulses, based on the illumination of the subject 114 with first set of flash pulses and on the received second indication. The circuitry 202 may be further configured to control the set of multi-view image capture devices 106 to capture the second image of the set of images, based on the illumination of the subject 114 with the second set of flash pulses and on the received second indication.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
  circuitry configured to:
    select, from a plurality of specific lighting patterns, a set of lighting patterns to capture a set of images of a subject, wherein
      a set of multi-view image capture devices captures the set of images of the subject, and
      the set of multi-view image capture devices is associated with the electronic device;
    control a lighting system associated with the electronic device to illuminate the subject with a first set of flash pulses, wherein
      the first set of flashes includes a first pulse and a second pulse,
      an illumination intensity of the first set of flash pulses increases from a first intensity associated with the first pulse to a second intensity associated with the second pulse, and
      the first intensity is lower than the second intensity;
    control the lighting system to illuminate the subject with a second set of flash pulses, based on the illumination of the subject with the first set of flash pulses, wherein the second set of flash pulses corresponds to the selected set of lighting patterns, and the illumination intensity of each of the second set of flash pulses corresponds to the second intensity;

control an auto-focus setting associated with each of the set of multi-view image capture devices, based on the selected set of lighting patterns; and control the set of multi-view image capture devices associated with the electronic device to capture each of the set of images of the subject, based on the illumination of the subject with the second set of flash pulses and the controlled auto-focus setting.

2. The electronic device according to claim 1, wherein the plurality of specific lighting patterns corresponds to one or more of an omni-directional lighting pattern, a directional lighting pattern, a cross-polarized lighting pattern, or a parallel-polarized lighting pattern.

3. The electronic device according to claim 1, wherein the selected set of lighting patterns corresponds to at least one of a first set of lighting patterns for shape reconstruction, or a second set of lighting patterns for normal and height map generation.

4. The electronic device according to claim 3, wherein the first set of lighting patterns includes one or more of a cross-polarized omni-directional lighting pattern or a parallel-polarized omni-directional lighting pattern.

5. The electronic device according to claim 3, wherein the second set of lighting patterns includes one or more of:
a first cross-polarized spherical gradient lighting pattern to illuminate the subject from a left-hand side of the subject,
a first parallel-polarized spherical gradient lighting pattern to illuminate the subject from the left-hand side,
a second cross-polarized spherical gradient lighting pattern to illuminate the subject from a right-hand side of the subject,
a second parallel-polarized spherical gradient lighting pattern to illuminate the subject from the right-hand side,
a third cross-polarized spherical gradient lighting pattern to illuminate the subject from a top of the subject,
a third parallel-polarized spherical gradient lighting pattern to illuminate the subject from the top,
a fourth cross-polarized spherical gradient lighting pattern to illuminate the subject from a bottom of the subject,
a fourth parallel-polarized spherical gradient lighting pattern to illuminate the subject from the bottom,
a fifth cross-polarized spherical gradient lighting pattern to illuminate the subject from a front-side of the subject,
a fifth parallel-polarized spherical gradient lighting pattern to illuminate the subject from the front-side,
a sixth cross-polarized spherical gradient lighting pattern to illuminate the subject from a back-side of the subject, or
a sixth parallel-polarized spherical gradient lighting pattern to illuminate the subject from the back-side.

6. The electronic device according to claim 1, wherein the circuitry is further configured to:
set a shutter speed associated with each of the set of multi-view image capture devices, based on a capture mode associated with the capture of the set of images;
set a delay and a flash duration associated with the lighting system, based on the set shutter speed; and synchronize the lighting system and the set of multi-view image capture devices to capture each of the set of images of the subject, based on the set delay and flash duration.

7. The electronic device according to claim 6, wherein the capture mode is one of a single-shot mode or a burst mode.

8. The electronic device according to claim 1, wherein the auto-focus setting corresponds to a per-frame auto-focus.

9. The electronic device according to claim 1, wherein the first pulse corresponds to a modeling light and the first intensity corresponds to a specific intensity.

10. The electronic device according to claim 1, wherein the circuitry is further configured to:
receive a first indication that a first image from the set of images is captured by the set of multi-view image capture devices; and
control the lighting system to illuminate the subject with the first pulse associated with the first intensity, based on the received first indication.

11. The electronic device according to claim 10, wherein the circuitry is further configured to:
receive a second indication of an initiation of capture of a second image from the set of images by the set of multi-view image capture devices;
control the lighting system to illuminate the subject with the first set of flash pulses, based on the received second indication;
control the lighting system to illuminate the subject with the second set of flash pulses, based on the illumination of the subject with the first set of flash pulses and on the received second indication; and
control the set of multi-view image capture devices to capture the second image of the set of images, based on the illumination of the subject with the second set of flash pulses and on the received second indication.

12. A method, comprising:
in an electronic device:
selecting, from a plurality of specific lighting patterns, a set of lighting patterns to capture a set of images of a subject, wherein
a set of multi-view image capture devices captures the set of images of the subject, and
the set of multi-view image capture devices is associated with the electronic device;
controlling a lighting system associated with the electronic device to illuminate the subject with a first set of flash pulses, wherein
the first set of flashes includes a first pulse and a second pulse,
an illumination intensity of the first set of flash pulses increases from a first intensity associated with the first pulse to a second intensity associated with the second pulse, and
the first intensity is lower than the second intensity;
controlling the lighting system to illuminate the subject with a second set of flash pulses, based on the illumination of the subject with the first set of flash pulses, wherein
the second set of flash pulses corresponds to the selected set of lighting patterns, and
the illumination intensity of each of the second set of flash pulses corresponds to the second intensity;
controlling an auto-focus setting associated with each of the set of multi-view image capture devices, based on the selected set of lighting patterns; and
controlling the set of multi-view image capture devices associated with the electronic device to capture each of the set of images of the subject, based on the illumination of the subject with the second set of flash pulses and the controlled auto-focus setting.

13. The method according to claim 12, wherein the plurality of specific lighting patterns corresponds to one or more of an omni-directional lighting pattern, a directional lighting pattern, a cross-polarized lighting pattern, or a parallel-polarized lighting pattern.

14. The method according to claim 12, wherein the selected set of lighting patterns corresponds to at least one of a first set of lighting patterns for shape reconstruction, or a second set of lighting patterns for normal and height map generation.

15. The method according to claim 14, wherein the first set of lighting patterns includes one or more of a cross-polarized omni-directional lighting pattern or a parallel-polarized omni-directional lighting pattern.

16. The method according to claim 14, wherein the second set of lighting patterns includes one or more of:
- a firstcross-polarized spherical gradient lighting pattern to illuminate the subject from a left-hand side of the subject,
- a first parallel-polarized spherical gradient lighting pattern to illuminate the subject from the left-hand side,
- a second cross-polarized spherical gradient lighting pattern to illuminate the subject from a right-hand side of the subject,
- a second parallel-polarized spherical gradient lighting pattern to illuminate the subject from the right-hand side,
- a third cross-polarized spherical gradient lighting pattern to illuminate the subject from a top of the subject,
- a third parallel-polarized spherical gradient lighting pattern to illuminate the subject from the top,
- a fourth cross-polarized spherical gradient lighting pattern to illuminate the subject from a bottom of the subject,
- a fourth parallel-polarized spherical gradient lighting pattern to illuminate the subject from the bottom,
- a fifth cross-polarized spherical gradient lighting pattern to illuminate the subject from a front-side of the subject,
- a fifth parallel-polarized spherical gradient lighting pattern to illuminate the subject from the front-side,
- a sixth cross-polarized spherical gradient lighting pattern to illuminate the subject from a back-side of the subject, or
- a sixth parallel-polarized spherical gradient lighting pattern to illuminate the subject from the back-side.

17. The method according to claim 12, further comprising:
- setting a shutter speed associated with each of the set of multi-view image capture devices, based on a capture mode associated with the capture of the set of images;
- setting a delay and a flash duration associated with the lighting system, based on the set shutter speed; and
- synchronizing the lighting system and the set of multi-view image capture devices to capture the set of images of the subject, based on the determined set delay and flash duration.

18. A non-transitory computer-readable medium having stored thereon, computer-executable instructions that when executed by an electronic device, causes the electronic device to execute operations, the operations comprising:
- selecting, from a plurality of specific lighting patterns, a set of lighting patterns to capture a set of images of a subject, wherein
  - a set of multi-view image capture devices captures the set of images of the subject, and
  - the set of multi-view image capture devices is associated with the electronic device;
- controlling a lighting system associated with the electronic device to illuminate the subject with a first set of flash pulses, wherein
  - the first set of flashes includes a first pulse and a second pulse,
  - an illumination intensity of the first set of flash pulses increases from a first intensity associated with the first pulse to a second intensity associated with the second pulse, and
  - the first intensity is lower than the second intensity;
- controlling the lighting system to illuminate the subject with a second set of flash pulses, based on the illumination of the subject with the first set of flash pulses, wherein
  - the second set of flash pulses corresponds to the selected set of lighting patterns, and
  - the illumination intensity of each of the second set of flash pulses corresponds to the second intensity;
- controlling an auto-focus setting associated with each of the set of multi-view image capture devices, based on the selected set of lighting patterns; and
- controlling the set of multi-view image capture devices associated with the electronic device to capture each of the set of images of the subject, based on the illumination of the subject with the second set of flash pulses and the controlled auto-focus setting.

* * * * *